(12) United States Patent
Kagawa et al.

(10) Patent No.: US 8,532,159 B2
(45) Date of Patent: Sep. 10, 2013

(54) TRANSMITTER, RECEIVER, WIRELESS COMMUNICATION SYSTEM, AND COMMUNICATION METHOD

(75) Inventors: Kazunori Kagawa, Nagoya (JP);
Norimasa Kobori, Toyota (JP);
Yukinori Fujita, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 748 days.

(21) Appl. No.: 12/670,878

(22) PCT Filed: Aug. 28, 2008

(86) PCT No.: PCT/IB2008/002226
§ 371 (c)(1),
(2), (4) Date: Jan. 27, 2010

(87) PCT Pub. No.: WO2009/027799
PCT Pub. Date: Mar. 5, 2009

(65) Prior Publication Data
US 2010/0202495 A1 Aug. 12, 2010

(30) Foreign Application Priority Data
Aug. 30, 2007 (JP) ................................. 2007-224638

(51) Int. Cl.
*H04B 1/00* (2006.01)

(52) U.S. Cl.
USPC ........... 375/142; 375/141; 375/140; 375/130; 375/147; 375/146; 375/136; 375/135; 708/308; 708/208

(58) Field of Classification Search
USPC ................. 375/142, 141, 140, 130, 147, 146, 375/136, 135; 708/308, 208
See application file for complete search history.

(56) References Cited

U.S. PATENT DOCUMENTS

| 5,636,123 A * | 6/1997 | Rich et al. ..................... 701/301 |
| 2002/0198632 A1 | 12/2002 | Breed et al. |
| 2008/0015771 A1 * | 1/2008 | Breed et al. .................. 701/207 |

FOREIGN PATENT DOCUMENTS

| JP | 4 121618 | 4/1992 |
| JP | 7 183828 | 7/1995 |
| JP | 11 145934 | 5/1999 |
| JP | 11 298376 | 10/1999 |
| JP | 11 331037 | 11/1999 |
| JP | 2000 193467 | 7/2000 |
| JP | 2000 207691 | 7/2000 |
| JP | 2001 513308 | 8/2001 |
| JP | 2001 513312 | 8/2001 |
| JP | 2004 363877 | 12/2004 |
| JP | 2005 33544 | 2/2005 |
| JP | 2006 163621 | 6/2006 |

* cited by examiner

*Primary Examiner* — Zewdu Kassa
(74) *Attorney, Agent, or Firm* — Oblon, Spivak, McClelland, Maier & Neustadt, L.L.P.

(57) ABSTRACT

A transmitter has a portion that sets a parameter about the transmitter itself based on a parameter made to correspond to a condition for selecting a receiver with which the transmitter communicate with, a portion that generates a spread code based on the set parameter, and a sending portion that spreads transmit-data to form a spread signal by the generated spread code, and that sends the spread signal. The receiver has a portion that receives the signal transmitted by the transmitter, a portion that sets a parameter about the receiver itself based on the parameter made to correspond to the condition, a portion that generates a despread code based on the set parameter, a portion that performs a correlation computation of the received signal and the generated despread code, and a portion that selects a transmitter with which the receiver communicates, based on a result of the correlation computation.

22 Claims, 21 Drawing Sheets

DESPREAD CODE GENERATED BY RECEIVER → 1 0 0 1 1 0 1 ⋯ 1 0 1 0 1 1 1

SPREAD CODE SPECIFICALLY DETERMINED FROM RECEIVED SIGNAL → 1 0 0 1 1 0 1 ⋯ 1 0 1 0 1 0 0
↑↑
DIFFERENT BITS

DESPREAD CODE GENERATED BY RECEIVER → 1 0 0 1 1 0 1 ⋯ 1 0 1 0 1 1 1

BIT INVERSION

REPLICA OF SPREAD CODE OF TRANSMITTER → 1 0 0 1 1 0 1 ⋯ 1 0 1 0 1 0 0

BIT INVERSION

| CLOCK | A→B | | REGISTER | | | CODE |
|---|---|---|---|---|---|---|
| 1 | 1 | 1 | 0 | 0 | 1 | ✕ |
| 2 | 2 | 4 | 1 | 0 | 0 | 1 |
| 3 | 3 | 2 | 0 | 1 | 0 | 0 |
| 4 | 4 | 5 | 1 | 0 | 1 | 0 |
| 5 | 5 | 6 | 1 | 1 | 0 | 1 |
| 6 | 6 | 7 | 1 | 1 | 1 | 0 |
| 7 | 7 | 3 | 0 | 1 | 1 | 1 |
| 8 | ✕ | ✕ | 0 | 0 | 1 | 1 |

| CLOCK | X | Y | Z | → REGISTER | | | | CODE |
|---|---|---|---|---|---|---|---|---|
| 1 | 00 | 00 | 00 | 0 | 0 | 0 | 1 | ✕ |
| 2 | 01 | 00 | 00 | 1 | 0 | 0 | 0 | 1 |
| 3 | 00 | 01 | 00 | 0 | 1 | 0 | 0 | 0 |
| 4 | 00 | 00 | 01 | 0 | 0 | 1 | 0 | 0 |
| 5 | 01 | 01 | 00 | 1 | 0 | 0 | 1 | 0 |
| 6 | 01 | 00 | 01 | 1 | 1 | 0 | 0 | 1 |
| 7 | 00 | 01 | 01 | 0 | 1 | 1 | 0 | 0 |
| 8 | 01 | 01 | 01 | 1 | 0 | 1 | 1 | 0 |
| 9 | 10 | 00 | 00 | 0 | 1 | 0 | 1 | 1 |
| 10 | 00 | 10 | 00 | 1 | 0 | 1 | 0 | 1 |
| 11 | 00 | 00 | 10 | 1 | 1 | 0 | 1 | 0 |
| 12 | 10 | 01 | 00 | 1 | 1 | 1 | 0 | 1 |
| 13 | 01 | 10 | 00 | 1 | 1 | 1 | 1 | 0 |
| 14 | 00 | 10 | 01 | 0 | 1 | 1 | 1 | 1 |
| 15 | 00 | 01 | 10 | 0 | 0 | 1 | 1 | 1 |
| 16 | ✕ | ✕ | ✕ | 0 | 0 | 0 | 1 | 1 |

F I G . 25
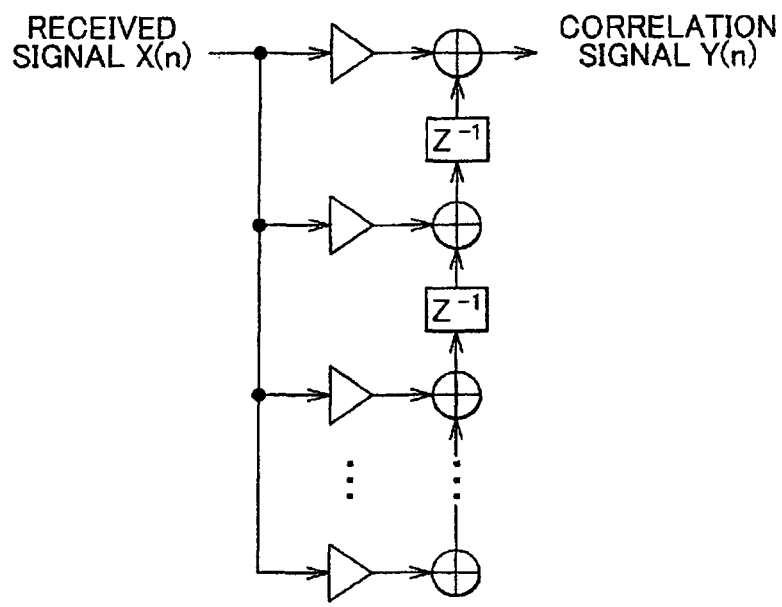
F I G . 26
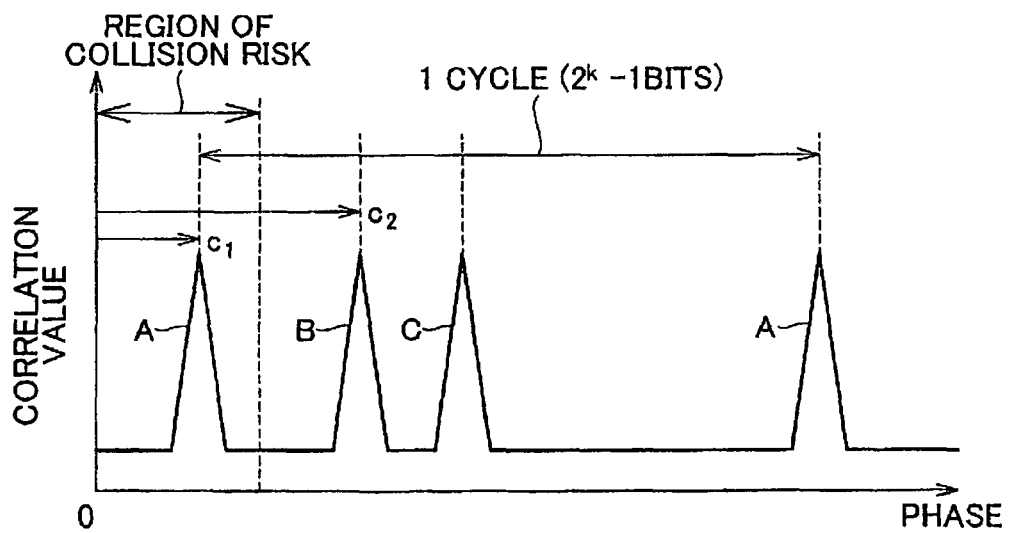

| VELOCITY TRANSMIT TIME | DIGITAL INFORMATION SIGNAL DESIRED TO BE SENT |

F I G . 32
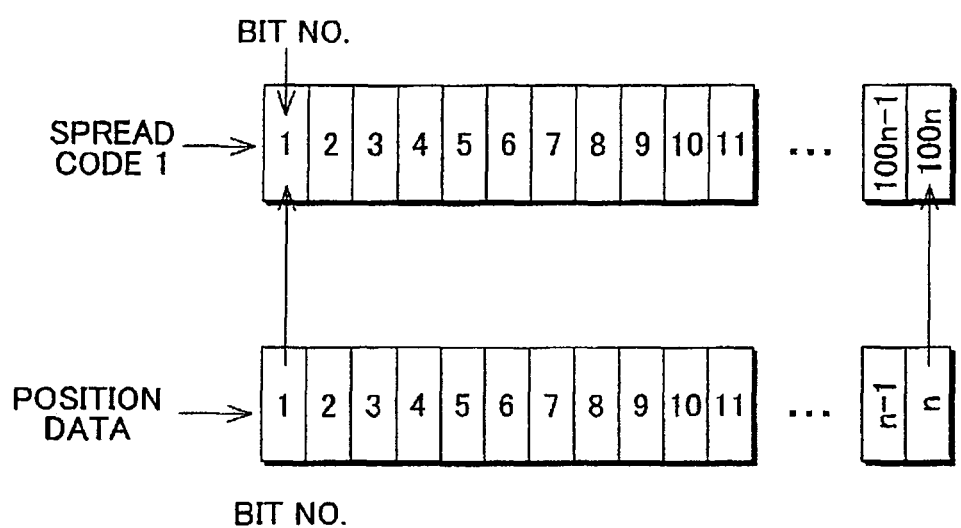

TRANSMITTER, RECEIVER, WIRELESS COMMUNICATION SYSTEM, AND COMMUNICATION METHOD

BACKGROUND OF THE INVENTION

1. Field of the Invention

The invention relates to a transmitter and a receiver each of which performs wireless communication with another communication device using a spread spectrum communication mode, and also relates to a wireless communication system and a communication method.

2. Description of the Related Art

Research and development of an advanced safety vehicle (ASV) is being conducted lately. In an advanced safety motor vehicle, the motor vehicle itself is made highly intelligent for the purpose of collision prevention, automatic driving, etc. For example, research about the vehicle-to-vehicle communication is being conducted in order to cope with traffic accidents that occur upon entering a corner, right (or left)-turn accidents or the like, etc.

In the communication that is purposed for collision avoidance, a communication device mounted in a vehicle broadcasts information regarding the position and velocity of the host vehicle, etc. in a time division multiple access mode, and the information is received by a communication device that is mounted in another vehicle. The communication device mounted in the another vehicle performs (1) a partner unit's electromagnetic wave acquisition process, (2) a communication data extraction process, (3) a logic process, and (4) an object extraction process. (1) In the partner unit's electromagnetic wave acquisition process, scanning to search for an electromagnetic wave from a partner unit is performed, and detection of a frequency unique to a communication partner, a timing synchronizing process, and a code correlation process, that is, the despreading of a received signal, are performed. (2) In the communication data extraction process, a demodulation process, a detection process, and a decoding process are performed. (3) In the logic process, data about all the partner units is tabled in accordance with the condition determined by an application installed. (4) In the objection detection process, the partner unit data that matches with various conditions is extracted in accordance with the installed application condition.

For example, in the communication purposed for collision avoidance that is performed by the advanced safety motor vehicles, the communication device mounted in each motor vehicle performs timing synchronization with the communication devices mounted in the other motor vehicles. As a result, the communication device mounted in a vehicle performs, for example, initial synchronism acquisition, and establishes communication with the communication device mounted in a vehicle that is present in a range that the electromagnetic wave transmitted by the communication device of the host vehicle reaches. Then, the communication device of each vehicle transmits data in a time division mode to the communication device with which the timing synchronization has been made. Each communication device transmits data in a communication time slot that is allotted to each communication device. Concretely, each communication device spreads framed data (position information, traveling velocity information) by its unique spread code allotted to the host vehicle, and then transmits the data. The other communication device performs the partner unit's electromagnetic wave acquisition process, the communication data extraction process, the logic process, and the object extraction process as described above. In the logic process, among these processes, the position data and/or the velocity data is tabled separately for each motor vehicle equipped with a communication device. In the object extraction process, for example, the position data and/or the velocity data is sorted so that a vehicle that becomes an object is extracted in accordance with a certain condition. For example, a vehicle that is likely to collide with the host vehicle, concretely, a vehicle which is present around the host vehicle and whose velocity vector intersects with that of the host vehicle is specifically determined. After that, the host vehicle performs communication with the specifically determined value, and avoids the collision by monitoring the movement of the vehicle.

However, the foregoing background art has the following problems.

One of the problems is that it is inevitable for a communication device to execute the communication establishment process with all the partners (communication devices) that the electromagnetic wave from the transmitter reaches. Concretely, the communication device mounted in a vehicle needs to perform communication processes, for example, the foregoing processes (1) and (2), with the communication devices reached by the electromagnetic wave among the communication devices mounted in the vehicles that are present around the host vehicle. Thus, there is a problem of large amounts of communication and large amounts of time required for the communication. Specifically, it takes a considerable amount of time before a vehicle that the host vehicle needs to communicate with is specifically determined. This problem becomes conspicuous when the number of vehicles present around the host vehicle increases. For example, in the case where one frame is constructed of number N slots (N is an integer>0) and the N slots are allotted to vehicles, the position and the traveling velocity of N vehicles can be detected during a period of time when one frame is being transmitted. Therefore, if the number of slots can be increased, the number of detectable vehicles can be increased. However, since there is a limit on the transmission speed that can be secured, the number of slots cannot be increased over a certain number. Besides, in the case where the number of slots is increased, the time taken before the detection of information about the vehicles present around the host vehicle becomes correspondingly long, and the time required before specific determination of a vehicle that is likely to collide with the host vehicle becomes long.

For example, in the case where there are a great number of vehicles, for example, about 5 to 200 vehicles, around the host vehicle in an environment of, for example, an intersection, a two (multi)-level crossing, two-level parallel roads, etc., it is difficult to specifically determine and establish communication with a vehicle that is likely to collide with the host vehicle from the vehicles present around the host vehicle instantaneously, concretely, within several hundred ms, which is permitted by the system. In a currently common communication method with a speed of, for example, several ten bps to 1 Mbps, the establishment of communication requires about several seconds. Therefore, for an application purposed for collision avoidance which is employed in the ASV that is expected to have communication with about 1000 communication units, the communication establishment process consumes an excessively long time.

In order to solve this problem by increasing the communication speed, a level of communication speed that is very hard to realize in the mobile communication is required. Concretely, a communication speed of about 20 Mbps is required. This communication speed is not realistic in the mobile communication, which is affected by various external disturbances, for example, noise, changes in electromagnetic wave intensity. Besides, such high communication speed becomes a factor of cost increase, and is therefore not preferable.

Besides, the communication device mounted in a vehicle needs to perform a process of extracting a partner unit that the application program needs from the communication devices with which communication is possible, among the communication devices mounted in other vehicles present around the host vehicle, for example, the foregoing processes (3) and (4). Thus, there is a problem of large amounts of data and computation processes, and therefore large amounts of time required. These processes have high requirements for hardware resources, for example, the memory capacity, the computation processing capability, etc. Besides, this problem is also a factor of cost increase. Besides, regardless of whether there is a need for communication, these processes are performed after the completion of the process of establishing communication with the communication devices mounted in other vehicles present around the host vehicle. Therefore, a considerable amount of time is taken before the processes are completed.

As described above, with the currently available technologies in the vehicle-to-vehicle communication, it is difficult to detect only a vehicle that is likely to collide with the host vehicle and establish communication with the vehicle within a time that is permitted by the system. For example, in a situation as shown in FIG. 1, it is difficult for a vehicle B to detect only a vehicle C that is likely to collide with the vehicle B and establish communication with the vehicle C. As a measure other than the raising of the communication speed, it is possible to mount a millimeter wave radar in the vehicle B and determine the positional relation with another vehicle by detecting reflection of the electric magnetic wave emitted from the millimeter wave radar. However, it is difficult to detect the direction of the vehicle or the velocity of the vehicle despite the determination of the positional relation with the vehicle. What can be detected by this method is only the relative distance to the vehicle.

Besides, it is also possible to mount a GPS (Global Positioning System) device in the vehicle B and wirelessly notify other vehicles of the position information about the vehicle B. However, this method requires identification codes for discriminating vehicles, and it is difficult to allot all the vehicles with discriminating identification codes. Besides, in the case where a communication system, for example, of cellular phones, is applied, it is also necessary to allot identification codes for discrimination between vehicles. However, since the number of identification codes is limited, it is impossible to allot identification codes to all the vehicles. Although it is conceivable to allot identification codes on a base-station basis, it becomes necessary to arrange an infrastructural facility, thus requiring high cost.

In conjunction with a communication device to which the foregoing spread spectrum communication mode is applied, a spread spectrum receiver that reduces the time needed for synchronization acquisition is disclosed (e.g., see Japanese Patent Application Publication No. 11-145934 (JP-A-11-145934)). This spread spectrum receiver initially acquires a PN signal by a large search step, and then detects the position of a peak in the correlation by a small search step.

However, it is necessary to perform an initial synchronization acquisition with each of the communication devices mounted in all the vehicles present within the range reached by the electromagnetic wave transmitted from the communication device mounted in the host vehicle, and it is impossible to specifically determine a vehicle that is likely to collide with the host vehicle, in addition to establishing communication therewith, within a time permitted by the system.

SUMMARY OF THE INVENTION

The invention has been accomplished in view of the aforementioned respects. It is an object of the invention to provide a transmitter, a receiver, a wireless communication system, and a communication method which are capable of reducing the amount of time it takes to specifically determine a communication device that needs to have communication, from a plurality of communication devices.

In order to solve the aforementioned problems, a transmitter of a first aspect of the invention is a transmitter that performs communication in a spread spectrum communication mode, wherein a condition for selecting a receiver with which the transmitter itself communicates, and a parameter corresponding to the condition are set, and the transmitter includes: a transmitter parameter setting portion that sets a parameter about the transmitter itself; a spread code generation portion that generates a spread code based on the parameter set by the transmitter parameter setting portion; and a transmitting portion which spreads transmit-data to form a spread signal by the spread code generated by the spread code generation portion, and which transmits the spread signal.

According to the first aspect, the transmitter is able to convert the parameter (value) of the device itself in the condition for selecting (tuning to) a communication partner into a PN code (spread code), and to spread and send data in the spread spectrum mode by using the spread code.

Besides, the transmitter parameter setting portion may set position information about the transmitter itself as the parameter of the transmitter itself.

With this construction makes, the transmitter is able to set the position information as the parameter (value) of the device itself for the condition for selecting (tuning to) a communication partner, and convert the position information into the PN code (spread code), and spread and send data in the spread spectrum mode by using the spread code.

A transmitter of a second aspect of the invention is a transmitter that performs communication in a spread spectrum communication mode, and includes: a synchronization portion that synchronizes the transmitter itself and the receiver with which the transmitter itself communicates; and a spread code generation portion that generates the spread code based on the position information about the transmitter itself; and a transmitting portion that spreads send-data to form a spread signal by the spread code generated by the spread code generation portion, and for sending the spread signal, and the spread code generation portion generates the spread code synchronously with the receiver based on the position information about the transmitter itself.

According to the second aspect, the transmitter is able to convert the position information into a spread code synchronously with a receiver.

A receiver of a third aspect of the invention is a receiver that performs communication in a spread spectrum communication mode, wherein a transmitter sets a parameter about the transmitter itself based on a parameter that corresponds to a condition for selecting the receiver with which the transmitter communicates, and generates a spread code based on the set parameter, and spreads send-data to form a signal by the generated spread code, and sends the signal. The receiver includes: a receiving portion that receives the signal transmitted by the transmitter; a receiver parameter setting portion that sets a parameter about the receiver itself based on the parameter that corresponds to the condition; a despread code generation portion that generates a despread code based on the parameter set by the receiver parameter setting portion; a correlation computation portion that performs a correlation computation of the signal received by the receiving portion and the despread code generated by the despread code generation portion; and a selection portion that sets a transmitter with which the receiver itself communicates, based on a result of the correlation computation.

According to the third aspect, the receiver is able to select a communication device (transmitter) to communicate with, prior to establishment of communication, on the basis of the computation of correlation between the data that the transmitter spreads and sends in the spread spectrum mode by using the spread code (PN code) obtained by converting the transmitter-side value of the parameter corresponding to the condition for selecting (tuning to) a communication partner and the PN code (despread code) that the receiver itself finds on the basis of the parameter for the condition on the side of the receiver itself.

Besides, the transmitter may set position information about the transmitter itself as the parameter of the transmitter itself, and the receiver parameter setting portion may set position information about the receiver itself as the parameter about the receiver itself.

With this construction, the receiver is able to select a communication device (transmitter) to communicate with, prior to establishment of communication, on the basis of the computation of correlation between the data that the transmitter sends in the spread spectrum mode by using the spread code (PN code) obtained by converting the position information set as a parameter for the condition for selecting (tuning to) a communication partner, and the PN code (despread code) that the receiver itself finds on the basis of the position information set as a parameter for the condition.

Besides, the correlation computation portion may have a position specific determination portion which compares the spread code generated by the transmitter and the despread code generated by the despread code generation portion, and which detects a bit string in which values do not match between the spread code and the despread code, which creates a replica spread code from the despread code by inverting the values of the bit string detected, and which detects the position information of the transmitter based on the created replica spread code.

With this construction, the receiver is able to estimate the position information of the transmitter on the basis of the transmit-data from the transmitter and the despread code generated by the receiver itself.

Besides, the receiver may further include a position estimation portion that estimates a position of the transmitter after elapse of a predetermined time based on the position information about the transmitter detected by the position specific determination portion, and the despread code generation portion may generate the despread code based on the position information estimated as the position of the transmitter occurring after the elapse of the predetermined time.

With this construction, the receiver is able to generate the despread code on the basis of the estimated position information. Specifically, a specific transmitter can be continuously detected without performing the correlation computation of the received signal and the generated despread code, that is, without a need to perform a process of selecting a transmitter.

A receiver of a fourth aspect of the invention is a receiver that performs communication in a spread spectrum communication mode, wherein a transmitter synchronous with the receiver itself generates a spread code synchronously with the receiver based on position information about the transmitter, and spreads send-data to form a spread signal by the generated spread code, and sends the spread signal. The receiver includes: a synchronization portion that synchronizes the receiver itself and the transmitter that communicates with the receiver itself; a receiving portion that receives the signal transmitted by the transmitter; a despread code generation portion that generates a despread code based on the position information about the receiver itself; a correlation computation portion that performs a correlation computation of the signal received by the receiving portion and the despread code generated by the despread code generation portion; and a selection portion that selects the transmitter that the receiver itself communicates with based on a result of the correlation computation. The despread code generation portion generates the despread code synchronously with the transmitter based on the position information about the receiver itself.

According to the fourth aspect, the receiver is able to generate a despread code based on the position information, synchronously with the transmitter.

A wireless communication system of a fifth aspect of the invention is a wireless communication system having a transmitter and a receiver that communicate in a spread spectrum communication mode. The transmitter has: a transmitter parameter setting portion that sets a parameter about the transmitter itself based on a parameter corresponding to a condition for selecting the receiver with which the transmitter itself communicates; a spread code generation portion that generates a spread code based on the parameter set by the transmitter parameter setting portion; and a transmitting portion that spreads transmit-data to form a spread signal by the spread code generated by the spread code generation portion, and that transmits the spread signal, and the receiver has: a receiving portion that receives the signal transmitted by the transmitter; a receiver parameter setting portion that sets a parameter about the receiver itself based on a parameter corresponding to the condition; a despread code generation portion that generates a despread code based on the parameter set by the receiver parameter setting portion; a correlation computation portion that performs a correlation computation of the signal received by the receiving portion and the despread code generated by the despread code generation portion; and a selection portion that selects the transmitter to communicate with based on a result of the correlation computation.

According to the fifth aspect, each of the transmitter and the receiver is able to convert the value of the device itself based on the condition for performing communication into a PN code (spread code), and to select a communication partner before establishing communication, in accordance with a result of correlation between the spread code generated by the transmitter and the despread code generated by the receiver.

Besides, the transmitter parameter setting portion may set position information about the transmitter itself as the parameter of the transmitter itself, and the receiver parameter setting portion may set position information about the receiver itself as the parameter of the receiver itself.

With this construction, each of the transmitter and the receiver is able to convert the position information into a PN code (spread code), and to select a communication partner before establishing communication, in accordance with a result of correlation between the spread code generated by the transmitter and the despread code generated by the receiver.

Besides, the selection portion may select the transmitter that has a correlation value higher than a predetermined threshold value.

With this construction, it is possible to select a transmitter whose correlation value is high, and to specifically determine and select a transmitter whose distance to the receiver is short.

Besides, the selection portion may select the transmitter that has a rate of change that is higher than a predetermined threshold rate.

This construction makes it possible to select a transmitter that has a high rate of change in the correlation value, and to specifically determine and select a transmitter that is approaching the receiver.

Besides, the spread code generation portion may generate a spread code that contains a first spread code that shows a planar position of the transmitter itself and a second spread code that shows a vertical position of the transmitter itself, and the despread code generation portion may generate a despread code that contains a first despread code that shows a planar position of the receiver itself and a second despread code that shows a vertical position of the receiver itself, and the correlation computation portion may perform a correlation computation of the signal received by the receiving portion with the first despread code and the second despread code.

This construction makes it possible to select a transmitter that becomes an object of communication, taking into consideration the difference in vertical position between the transmitter and the receiver.

Besides, the selection portion may exclude beforehand the transmitter from an object of selection if a result of correlation of the transmitter based on the second spread code is less than or equal to a predetermined value.

This construction makes it possible to select a transmitter that becomes an object of communication, taking into consideration the difference in vertical position between the transmitter and the receiver.

A wireless communication system of a sixth aspect of the invention is a wireless communication system that has a transmitter and a receiver that communicate in a spread spectrum communication mode. The transmitter has: a synchronization portion that synchronizes the transmitter itself and the receiver with which the transmitter itself communicates; a spread code generation portion that generates a spread code synchronously with the receiver based on position information about the transmitter itself; and a transmitting portion that spreads transmit-data to form a spread signal by the spread code generated by the spread code generation portion, and that transmits the spread signal, and the receiver has: a synchronization portion that synchronizes the receiver itself and the transmitter with which the receiver itself communicates; a receiving portion that receives the signal transmitted by the transmitter; a despread code generation portion that generates a despread code synchronously with the transmitter based on position information about the transmitter itself; a correlation computation portion that performs a correlation computation of the signal received by the receiving portion and the despread code generated by the despread code generation portion; and a selection portion that selects the transmitter to communicate with, based on a result of the correlation computation.

This construction makes it possible to synchronize the transmitter and the receiver, and to convert the position information occurring at the time point of acquisition of synchronization into a spread code and a despread code.

Besides, the spread code and the despread code have periodicity, and phase of the spread code and the despread code and position may be made to correspond to each other beforehand, and the spread code generation portion may generate the spread code based on the phase of the spread code made to correspond to the position information of the transmitter, and the despread code generation portion may generate the despread code based on the phase of the despread code made to correspond to the position information of the receiver.

Besides, the spread code and the despread code may be constructed so as to correspond to spatial position on a one-to-one basis.

Besides, the spread code and the despread code made to correspond to the position may be constructed so as to be different from each other only in phase, and be the same in succession.

Besides, the synchronization portion may perform synchronization by time of a GPS.

For example, the synchronization may be acquired with the PPS signal transmitted from the GPS.

Besides, the synchronization portion may perform the synchronization by causing fluctuation of the phase to be followed based on information obtained from the GPS.

Besides, the selection portion may select the transmitter to communicate with based on a phase difference between the despread code generated by the receiver itself and the spread code generated by the transmitter.

Besides, the transmitter may have a transmitter resolution adjustment portion that adjusts resolution of the position information about the transmitter, and the receiver may have a receiver resolution adjustment portion that adjusts resolution of the position information about the receiver.

The foregoing constructions make it possible to reduce the code length.

Besides, an origin point of the position information may be an electric reference point.

This construction will restrain the code length.

A communication method of a seventh aspect of the invention is a communication method in a wireless communication system that has a transmitter and a receiver that communicate in a spread spectrum communication mode, and includes: the transmitter parameter setting step in which the transmitter sets a parameter about the transmitter itself based on a parameter made to correspond to a condition for selecting the receiver with which the transmitter itself communicates; the spread code generation step in which the transmitter generates a spread code based on the parameter set in the transmitter parameter setting step; the sending step in which the transmitter spreads send-data to form a spread signal by the spread code generated in the spread code generation step, and sends the spread signal; the receiving step in which the receiver receives the signal transmitted by the transmitter; the receiver parameter setting step in which the receiver sets a parameter about the receiver itself based on the parameter made to correspond to the condition; the despread code generation step in which the receiver generates a despread code based on the parameter set in the receiver parameter setting step; the correlation computation step in which the receiver performs a correlation computation of the signal received in the receiving step and the despread code generated in the despread code generation step; and the selection step in which the receiver selects the transmitter to communicate with based on a result of the correlation computation.

According to the seventh aspect, each of the transmitter and the receiver is able to convert the value of the device itself based on the condition for performing communication into a PN code (spread code), and to select a communication partner before establishing communication, in accordance with a result of correlation between the spread code generated by the transmitter and the despread code generated by the receiver.

A communication method of an eighth aspect of the invention is a communication method in a wireless communication system that has a transmitter and a receiver that communicate in a spread spectrum communication mode, and includes: the synchronization step in which the transmitter and the receiver are synchronized; the spread code generation step in which the transmitter generates a spread code synchronously with the receiver based on position information about the transmitter itself; the transmitting step in which the transmitter spreads send-data to form a spread signal by the spread code generated in the spread code generation step, and transmits the spread signal; the receiving step in which the receiver receives the signal transmitted by the transmitter; the despread code generation step in which the receiver generates a despread code synchronously with the transmitter based on position information about the transmitter itself; the correlation computation step in which a correlation computation of the signal received in the receiving step and the despread code generated in the despread code generation step is performed; and the selection step in which the receiver selects the transmitter to communicate with based on a result of the correlation computation.

According to the eighth aspect, it is possible to synchronize the transmitter and the receiver, and to convert the position information occurring at the time point of acquisition of synchronization into a spread code and a despread code.

According to the foregoing aspects and constructions of the invention, it is possible to realize a transmitter, a receiver, a wireless communication system, and a communication method which are capable of reducing the amount of time it takes to specifically determine a communication device that needs to have communication, from a plurality of communication devices.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 25 is an illustrative diagram showing an example of a correlation computation device;

FIG. 26 is an illustrative diagram showing a process of selecting a transmitter that is performed in a receiver in accordance with an embodiment of the invention;

FIG. 32 is an illustrative diagram showing a spread code generation process in accordance with an embodiment of the invention.

DETAILED DESCRIPTION OF EMBODIMENTS

Figure 1:
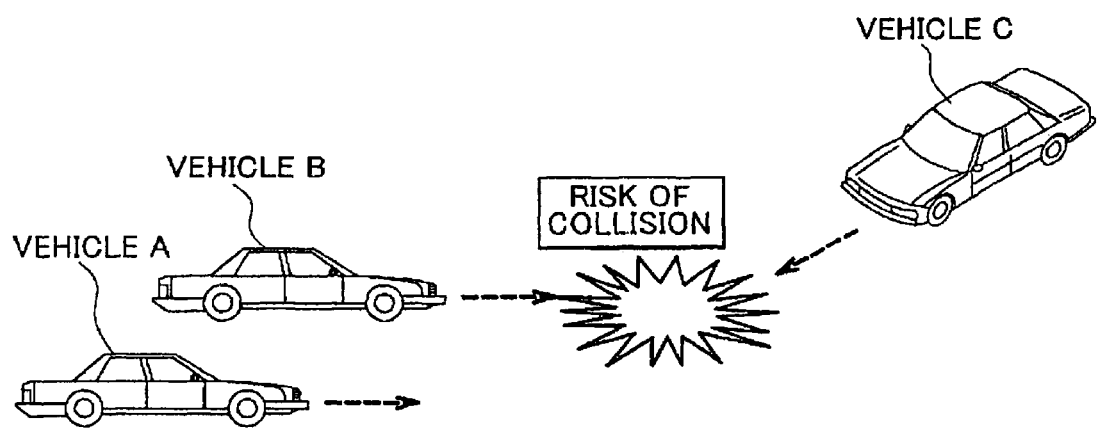
FIG. 1 is an illustrative diagram showing a problem in vehicle-to-vehicle communication.

Next, best modes for carrying out the invention will be described on the basis of the following embodiments with reference to the drawings.

In all the diagrams for describing the embodiments, portions and the like that have the same functions are represented by the same reference characters, and repeated descriptions will be omitted.

First Embodiment

Figure 2:
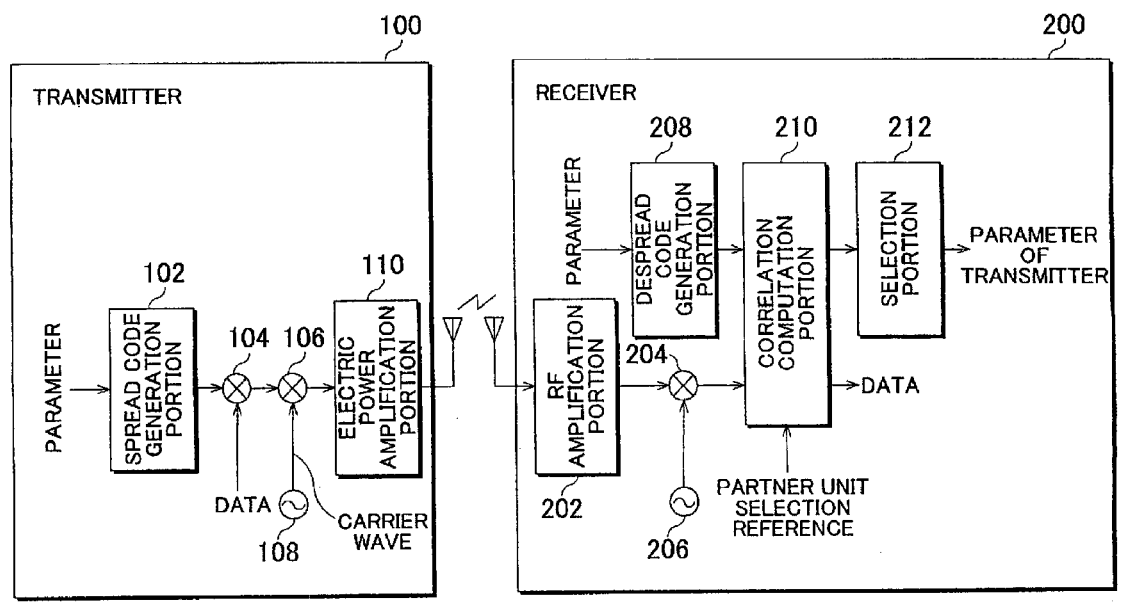
FIG. 2 is a partial block diagram showing a transmitter and a receiver in accordance with an embodiment of the invention.

A wireless communication system in accordance with a first embodiment of the invention will be described with reference to FIG. 2. The wireless communication system in accordance with this embodiment includes a transmitter 100, and a receiver 200. The transmitter 100, and the receiver 200 are, for example, mounted in a vehicle. For example, a communication device that has the transmitter 100 and the receiver 200 may be mounted in a vehicle. Besides, it is also permissible to mount only one of the transmitter 100 and the receiver 200 in a vehicle. In this embodiment, for convenience in description, the following description will be made in conjunction with the case where a signal transmitted from the transmitter 100 is received by the receiver 200 that is mounted in a vehicle that is different from the vehicle in which the transmitter 100 is mounted.

The transmitter 100 and the receiver 200 in accordance with the embodiment perform wireless communication in a spread spectrum communication mode. Besides, between the transmitter 100 and the receiver 200, a condition for selecting devices that perform mutual communication, and parameters that correspond to this condition are set.

The transmitter 100 in accordance with the embodiment will be described.

The transmitter 100 in accordance with the embodiment a spread code generation portion 102, a spread process portion 104, a modulation process portion 106, a local oscillator 108, and an electric power amplification portion 110.

A parameter (encoding information) of the host vehicle's transmitter 100 that corresponds to a condition for selecting (tuning to) a communication partner is input to the spread code generation portion 102. For example, in vehicle-to-vehicle communication whose purpose (condition) is avoidance of collision, it is preferable that the parameter for selecting a communication partner be position information regarding the host vehicle in which the transmitter 100 is mounted. Besides, from the viewpoint that the purpose (condition) of the vehicle-to-vehicle communication is recognition of an oncoming vehicle, it is preferable that parameter be vehicle velocity information regarding the host vehicle in which the transmitter 100 is mounted.

The spread code generation portion 102 generates a spread code on the basis of the input parameter, and inputs the generated spread code to the spread process portion 104. The spread codes are required to be high in autocorrelation characteristic and low in crosscorrelation characteristic. The spread process portion 104 spreads send-data using the spread code input thereto, and inputs the spread send-data to the modulation process portion 106. The modulation process portion 106 performs carrier modulation with respect to the signal that has been subjected to the spread process, by using a carrier wave input thereto from the local oscillator 108, and inputs the carrier-modulated signal to the electric power amplification portion 110. The electric power amplification portion 110 performs electric power amplification with respect to the signal input thereto, and sends the signal.

The receiver 200 in accordance with the embodiment will be described.

The receiver 200 in accordance with the embodiment includes an RF (Radio Frequency) amplification portion 202, a frequency conversion portion 204, a local oscillator 206, a despread code generation portion 208, a correlation computation portion 210, and a selection portion 212.

The signal transmitted from the transmitter 100 is amplified by the RF amplification portion 202, and then is input to the frequency conversion portion 204. The frequency conversion portion 204 performs frequency conversion on the amplified RF signal by using a carrier wave input from the local oscillator 206, whereby the RF signal is converted into a base band signal. The base band signal is then input to the correlation process portion 210.

Meanwhile, a parameter of the host vehicle's receiver 200 that corresponds to the condition for selecting (tuning to) a communication partner is input to the despread code generation portion 208. For example, in the vehicle-to-vehicle communication whose purpose is collision avoidance, it is preferable that a parameter for selecting a communication partner be position information regarding the host vehicle in which the receiver 200 is mounted. Besides, from the viewpoint that the purpose (condition) of the vehicle-to-vehicle communication is recognition of an oncoming vehicle, it is preferable that the parameter be vehicle velocity information regarding the host vehicle in which the transmitter 100 is mounted.

The despread code generation portion 208 generates a despread code on the basis of the input parameter, and inputs the generated despread code to the correlation computation portion 210. The process performed at this stage is performed by an algorithm similar to that of the aforementioned spread code generation portion 102.

The correlation computation portion 210 performs a correlation computation of the input base band signal and the despread code that has been input from the despread code generation portion 208. The correlation computation portion 210 inputs the degree of correlation thus found to the selection portion 212. For example, the correlation computation portion 210 is constructed of a matched filter.

The selection portion 212 determines whether or not there is a need to perform communication with the transmitter 100 on the basis of whether or not the correlation degree input as described above is greater than or equal to a predetermined correlation degree threshold value that is determined beforehand. The output of (input from) the correlation computation portion 210 becomes greater becomes great if the correlativity between the base band signal and the despread code is high, that is, if the similarity between the two signals is high. The selection portion 212 has determined beforehand as a correlation degree threshold value the correlation degree that is considered needed for a transmitter that the host vehicle's receiver 200 needs to communicate with, and performs the aforementioned determination on the basis of the predetermined correlation degree threshold value.

In a related-art communication system to which the spread spectrum mode is applied, a known spread code is used between a transmitter 100 and a receiver 200, and communication is performed only with a transmitter that has a correlation degree of 100%, and the spread code is not altered. In this embodiment, however, a spread code generated on the basis of the parameter of a host vehicle's device for selecting (tuning to) a communication partner is used, and therefore the spread code to be used is changed. Through the operation in this manner, a communication partner can be selected at the time point of computation of the correlation value (degree), that is, before communication between the transmitter 100 and the receiver 200 is established. Besides, in the case of selecting a transmitter that is to be a communication partner, a process of creating a table of position data and/or velocity data for every motor vehicle equipped with the communication devices can be made unnecessary by a tabling tool used for the communication establishment process/data giving-receiving process/selection reference, so that the time taken by the specific determination of a transmitter that the host vehicle's device needs to communicate with.

Figure 3:
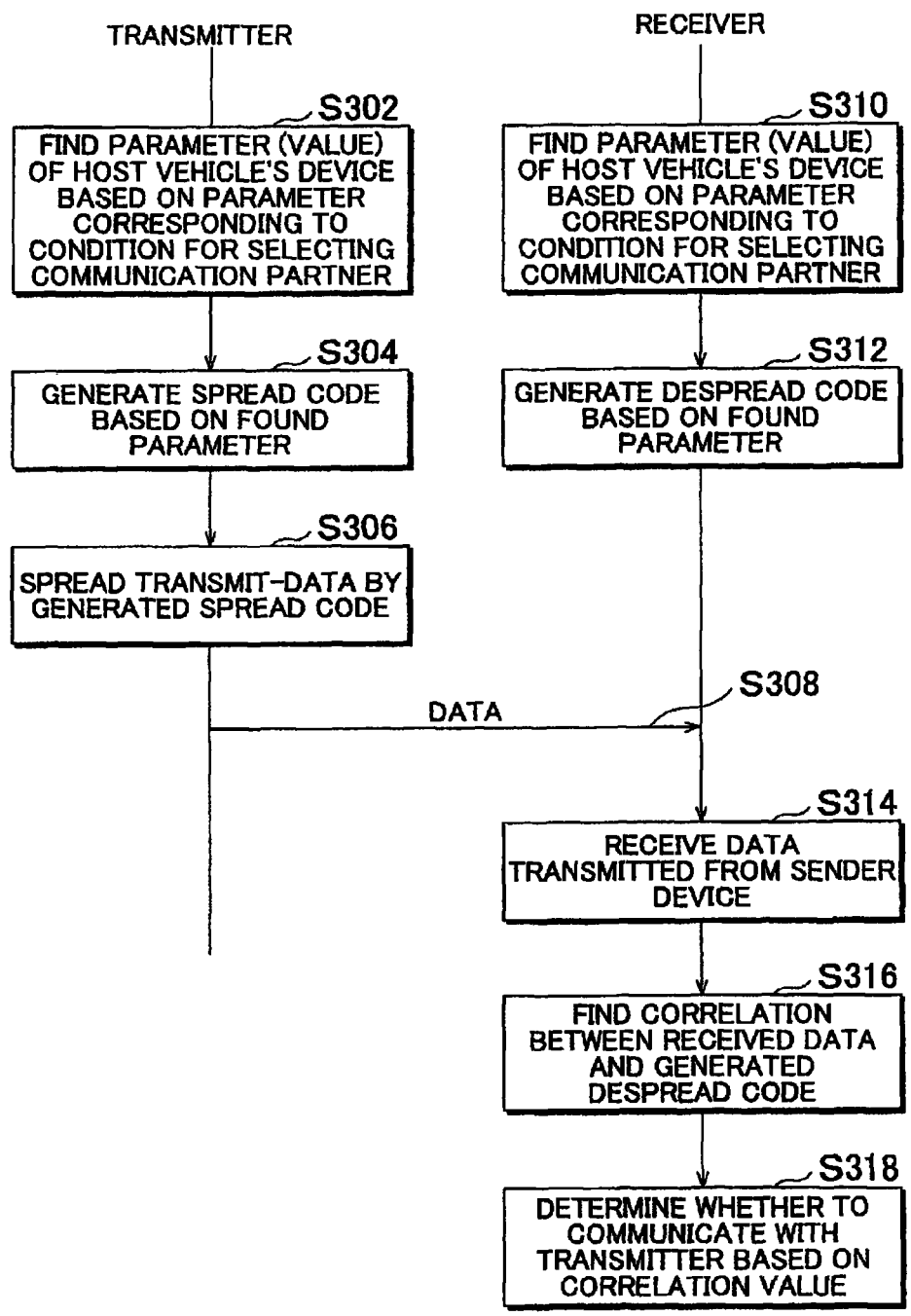
FIG. 3 is a flowchart showing an operation of the transmitter and the receiver in accordance with an embodiment of the invention.

Next, a communication method in the wireless communication system in accordance with this embodiment will be described with reference to FIG. 3.

The transmitter 100 finds a parameter (value) about the host vehicle's transmitter 100 on the basis of a parameter that corresponds to the condition for selecting a communication partner (step S302).

The transmitter 100 generates a spread code on the basis of the thus-found parameter (step S304).

The transmitter 100 spreads send-data using the generated spread code (step S306), and sends the data (step S308).

On the other hand, the receiver 200 finds a parameter (value) about the host vehicle's receiver 200 on the basis of a parameter that corresponds to the condition for selecting a communication partner (step S310).

The receiver 200 generates a despread code on the basis of the thus-found parameter (step S312).

The receiver 200 receives the data transmitted by the transmitter 100 (step S314).

The receiver 200 finds a correlation between the received data and the generated despread code (step S316).

The receiver 200 determines whether or not to perform communication with the transmitter 100 on the basis of the found correlation value (step S318).

Although in this embodiment, the send-data is spread by the spread process portion 104 through the use of the spread code, and is digitally modulated by the modulation process portion 106, the data may be spread by the spread code after being digitally modulated.

Second Embodiment

Figure 4:
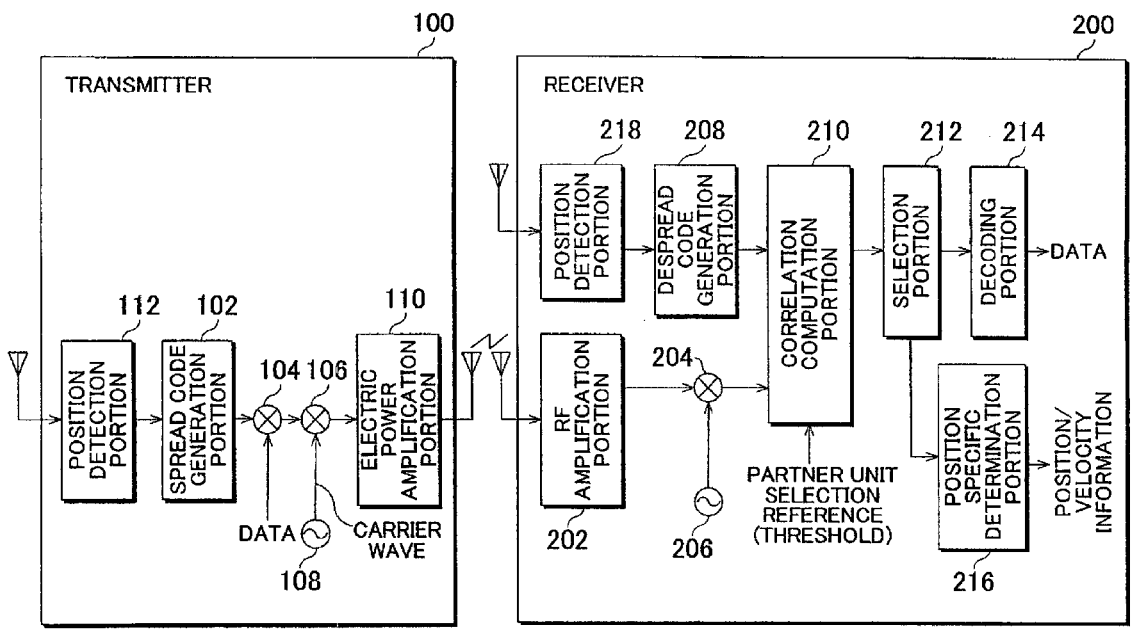
FIG. 4 is a partial block diagram of the transmitter and the receiver in accordance with an embodiment of the invention.

Next, a wireless communication system in accordance with a second embodiment of the invention will be described with reference to FIG. 4. The wireless communication system in accordance with this embodiment is a system based on the foregoing embodiment in which position information is applied as a parameter that corresponds to the condition for selecting a communication partner.

A transmitter 100 in accordance with this embodiment will be described.

The transmitter 100 in accordance with this embodiment includes a spread code generation portion 102, a spread process portion 104, a modulation process portion 106, a local oscillator 108, an electric power amplification portion 110, and a position detection portion 112.

The position detection portion 112 detects the position of the host vehicle in which the transmitter 100 is mounted, and inputs the detected position information to spread code generation portion 102. For example, the position detection portion 112 is constructed of a GPS receiver, and receives GPS signals transmitted from a plurality of artificial satellites, and measures the position of the host vehicle in which the transmitter 100 is mounted. Besides, the vehicle velocity may also be measured.

The spread code generation portion 102 generates a spread code on the basis of the input position information, and inputs the generated spread code to the spread process portion 104. The spread codes are required to be high in autocorrelation characteristic and low in crosscorrelation characteristic. As for the spread codes used by the transmitter 100 and the receiver 200 used in this embodiment, the bit difference between the codes of the two devices is set to be smaller the shorter the distance between the two devices, and to be greater the longer the distance therebetween. The spread process portion 104 spreads send-data using the spread code input thereto, and inputs the spread send-data to the modulation process portion 106. The modulation process portion 106 performs carrier modulation with respect to the signal that has been subjected to the spread process, by using a carrier wave input thereto from the local oscillator 108, and inputs the carrier-modulated signal to the electric power amplification portion 110. The electric power amplification portion 110 performs electric power amplification with respect to the signal input thereto, and sends the signal.

The receiver 200 in accordance with this embodiment will be described.

The receiver 200 in accordance with the embodiment includes an RF amplification portion 202, a frequency conversion portion 204, a local oscillator 206, a despread code generation portion 208, a correlation computation portion 210, a selection portion 212, a demodulation portion 214, a position specific determination portion 216, and a position detection portion 218.

The signal transmitted from the transmitter 100 is amplified by the RF amplification portion 202, and then is input to the frequency conversion portion 204. The frequency conversion portion 204 converts the amplified RF signal into a base band signal by performing frequency conversion through the use of a carrier wave input from the local oscillator 206, and inputs the base band signal to the correlation process portion 210.

In the meantime, the position detection portion 218 detects the position of the host vehicle in which the receiver 200 is mounted, and inputs the detected position information to the despread code generation portion 208. For example, the position detection portion 218 is constructed of a GPS receiver, and receives GPS signals transmitted from a plurality of artificial satellites, and measures the position and velocity of the host vehicle in which the receiver 200 is mounted.

The despread code generation portion 208 generates a despread code on the basis of the input position information, and inputs the generated despread code to the correlation computation portion 210. The process performed at this stage is performed by an algorithm similar to that of the aforementioned spread code generation portion 102.

The correlation computation portion 210 performs a correlation computation of the input base band signal and the input despread code, and inputs a result of the computation to the selection portion 212. For example, the correlation computation portion 210 is constructed of a matched filter. For example, the correlation computation portion 210 performs a correlation computation of the signal received from the transmitter 100 present around the host vehicle's receiver 200, and the despread code generated on the basis of the position of the host vehicle's receiver 200. The signal transmitted from the transmitter 100 is a signal spread by the spread code that is generated on the basis of the position information regarding the transmitter 100, and the despread code generated by the receiver 200 is a signal generated on the basis of the position information regarding the receiver 200. Therefore, the closer the position of the transmitter 100 and the position of the receiver 200 are to each other, the higher the similarity of the codes of the two devices is, and therefore the higher the correlation degree is.

The selection portion 212 determines whether or not there is a need to perform communication with the transmitter 100 on the basis of whether or not the correlation degree input as described above is greater than or equal to a predetermined threshold value (partner unit selection threshold value) that is determined beforehand. For example, in the case where the communication purpose (condition) is merely to perform the monitoring of surroundings in which merely surrounding vehicles are extracted, concretely, in the case where the communication purpose (condition) is to limit the communication only to the communication with partner units (vehicles) within a certain distance, it is determined whether or not there is a need to perform communication with the transmitter 100 on the basis of whether a distance from the host vehicle is greater than or equal to a predetermined distance (the partner unit selection threshold); that is, on the basis of whether or not the input correlation degree, that is correlated to the distance from the host vehicle, is greater than or equal to a predetermined correlation degree value (the partner unit selection threshold). Through the operation in this manner, a transmitter that is near from the receiver 200 can be specifically determined and can be selected. Furthermore, by determining the need for communication on the basis of whether or not the distance to a partner unit is decreasing, that is, the correlation degree is increasing, the vehicles selected can be limited to approaching vehicles.

Besides, for example, in the case where the communication purpose (condition) is to avoid collisions, such as an offset collision upon entering a corner, concretely, in the case where the communication purpose (condition) is to limit the communication to the communication with a partner unit (vehicle) that has a risk of colliding with the host vehicle, the need for communication is determined on the basis of whether or not the distance of the partner unit from the host vehicle is within the condition distance and is decreasing, in other words, whether or not the input correlation degree is greater than or equal to a correlation degree that corresponds to the condition distance from the host vehicle, and has a rising tendency. Specifically, a partner unit is narrowed down and detected on the basis of the distance thereof from the host vehicle. The time-dependent change of the correlation degree is proportional to the relative vehicle velocity, the relative velocity of a partner-unit vehicle can be detected from the increase or decrease of the correlation degree with regard to the vehicle. After that, the selection portion 212 detects a vehicle whose expected trajectory intersects with that of the host vehicle from the position (distance) and the velocity (relative velocity) of the vehicle, for example, by using an application program.

Figures 5, 6, 7:
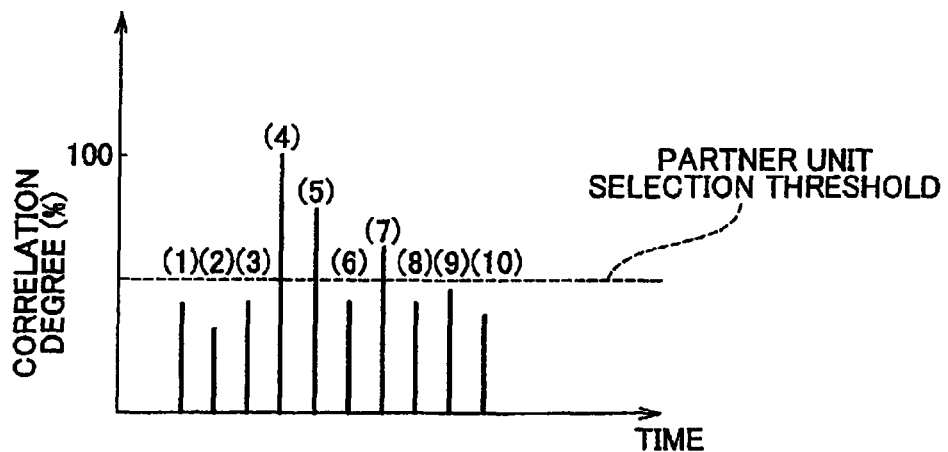
FIG. 5 is an illustrative diagram showing a process of selecting a transmitter that becomes a communication partner of the receiver in accordance with an embodiment of the invention.
FIG. 6 is an illustrative diagram showing a data demodulation process performed in the receiver in accordance with an embodiment of the invention.
FIG. 7 is an illustrative diagram showing a process of generating a replica of a spread code of a transmitter that is performed in the receiver in accordance with an embodiment of the invention.

Besides, for example, in the case where the communication purpose (condition) is the application of the system to the assistance in the detection regarding the rearward blind spots on expressways, concretely, in the case where the communication purpose (condition) is to extract an object vehicle in order to avoid the contact between vehicles on a multi-lane road, it is determined whether or not there is a need for communication with a vehicle on the basis of whether or not the vehicle is within the condition distance from the host vehicle. Then, with regard to a vehicle existing within the condition distance from the host vehicle, the relative velocity of the vehicle is detected from the increase or decrease of the correlation degree. Since the time-dependent change of the correlation degree is proportional to the relative vehicle velocity, the relative velocity of the vehicle can be detected form the increase or decrease of the correlation degree with regard to the vehicle. After that, the selection portion 212 acquires the correlation degree regarding the vehicle, for example, by using an application program. For example, in the case where a vehicle whose velocity vector is within a condition range from the velocity vector of the host vehicle is to be detected, for example, in the case where surrounding vehicles alone are merely detected by the surrounding monitoring, the selection portion 212 obtains from the correlation computation portion 210 the correlation degree that corresponds to the transmitter of each surrounding vehicle when a plurality of such vehicles exist around the receiver 200 of the host vehicle and signals are transmitted from the transmitters that are mounted in those vehicles. By checking the various correlation degrees of the transmitters of the vehicles, the selection portion 212 selects a transmitter that has a correlation degree that is greater than or equal to a predetermined partner unit determination threshold value. Concretely, in the case where ten vehicles exist around the receiver 200 of the host vehicle and signals are transmitted from the transmitters 100 mounted in the ten vehicles, for example, ten correlation degrees are obtained as shown in FIG. 5. In that case, the selection portion 212 selects a transmitter that has a correlation degree that is greater than or equal to a partner unit selection threshold value, concretely, selects transmitters corresponding to peaks (4), (5) and (7) in FIG. 5. After that, communication is established with the selected transmitters. The selection portion 212 inputs to the demodulation portion 214 and the position specific determination portion 216 a received signal and a despread code of each of the transmitters 100 that have been determined to be transmitters that the host vehicle's receiver 200 needs to communicate with.

The demodulation portion 214 decodes the signals transmitted from the selected transmitters 100. The demodulation portion 214 compares the despread code generated by the despread code generation portion 208 and the spread code used for the sending by the transmitter 100, and specifically determines the different bits. Then, the demodulation portion 214 estimates the spread codes that have been generated by the transmitters 100, by inverting the specifically determined bits of the despread codes. The demodulation portion 214 performs the decoding of each received signal through the use of each estimated spread code (a replica of the spread code of each transmitter 100). As a result, the send-data from each transmitter 100 is obtained. For example, as shown in FIG. 6, the despread code generated by the host vehicle's receiver 200 and the spread code obtained from the received signal are compared, and the positions (bit numbers) of different bits are specifically determined. In the case where a vehicle equipped with the transmitter 100 is near a vehicle equipped with the receiver 200, the PN codes (the spread code and the despread code) can be different only in several bits from the least significant bit end due to the adjacent positions of the two devices. FIG. 6 shows a case where, in the sequence of the spread code expressed in binary numbers, the least significant bit and the second least significant bit are different from those in the sequence of the despread code. Then, as shown in FIG. 7, the values at the aforementioned positions of different bits in the despread code generated by the receiver itself are inverted to generate a replica of the spread code of the transmitter 100. By inverting the different bits in this manner, the code that has been used by the transmitter 100 is obtained. The demodulation portion 214 despreads the received signal by using the generated replica of the spread code of the transmitter 100, and thereby decodes the data.

The position specific determination portion 216 finds a replica of the spread code of the transmitter 100 through a process similar to the process of the demodulation portion 214. The position specific determination portion 216 calculates the position of the transmitter 100 on the basis of the found replica of the spread code of the transmitter 100. For example, the position specific determination portion 216 detects the position of the transmitter 100 by performing a process that is opposite in direction to the process that is performed by the despread code generation portion 208.

Besides, the position specific determination portion 216 may find the amount of change in position and the moving velocity of the transmitter 100 on the basis of the replicas of the spread codes of the transmitter 100 that are periodically input. Through the operation in this manner, the position of the transmitter 100 can be detected at an earlier stage, for example, a time point of the signal detection process, without performing the modulation process nor the demodulation process.

In the case where the vehicle having a transmitter 100 that the host vehicle's receiver 200 needs to communicate with is moving, the spread code used by the transmitter 100 is altered due to the movement, and therefore the receiver 200 needs to generate a despread code following the alteration of the spread code. In this case, a replica of the spread code may be generated as described above, or a corresponding despread code may be predicted by a method shown below.

The position specific determination portion 216 inputs to the position detection portion 218 position information (Xt, Yt, Zt) regarding the position of the transmitter 100 at a time t which is determined by the replica of the spread code.

On the other hand, the data transmitted from the transmitter 100 has been arranged so as to include the velocity information (Vxt, Vyt, Vzt) regarding the vehicle in which transmitter 100 is mounted. The velocity information is acquired, for example, by the position detection portion 112 in the transmitter 100. The demodulation portion 214 inputs to the position detection portion 218 the velocity information obtained as a result of the decoding.

The position detection portion 218 predicts the position of the vehicle by expression (1) on the basis of the input position information and the input velocity information at the time t regarding the vehicle in which the transmitter 100 is mounted. In expression (1), is a sampling time (s).

[Mathematical Expression 1] (1)

$$\begin{pmatrix} X_{t+1} \\ Y_{t+1} \\ Z_{t+1} \end{pmatrix} = \begin{pmatrix} X_t \\ Y_t \\ Z_t \end{pmatrix} + \begin{pmatrix} V_{xt} \\ V_{yt} \\ V_{zt} \end{pmatrix} t_s$$

The position detection portion 218 inputs the predicted position information of the transmitter 100 to the despread code generation portion 208. The despread code generation portion 208 generates a despread code on the basis of the predicted position information.

Due to the construction in this manner, the spread code (PN code) used by the transmitter 100 of a partner unit can be predicted on the basis of the position of the partner unit (transmitter 100) at the time t+1. Therefore, it is possible to continue the communication with the transmitter 100 that is determined at the time t to be a device that the host vehicle's device needs to communicate with, by using the despread code generated through the prediction of the spread code at the time t+1, without selecting a partner unit by performing the correlation computation. In this case, if the despreading is successfully performed by the despread code predicted at the time t+1, it is determined that the transmitter that transmitted the data that was successfully despread is the same transmitter that was determined at the time t to be a transmitter requiring the communication with the host vehicle's receiver 200. If the communication cannot be continued, for example, if the despreading is successfully performed by the despread code predicted at the time t+1, there is a need to specifically determine a communication partner and establish communication therewith again by generating a despread code and performing a correlation computation on the basis of the position of the host vehicle's receiver 200.

Besides, by predicting the position of the transmitter at the time t+1, it is possible to not merely perform an operation for continuing the communication but also trace the movement of the partner unit, that is, the change in the position thereof.

Third Embodiment

Figure 8:
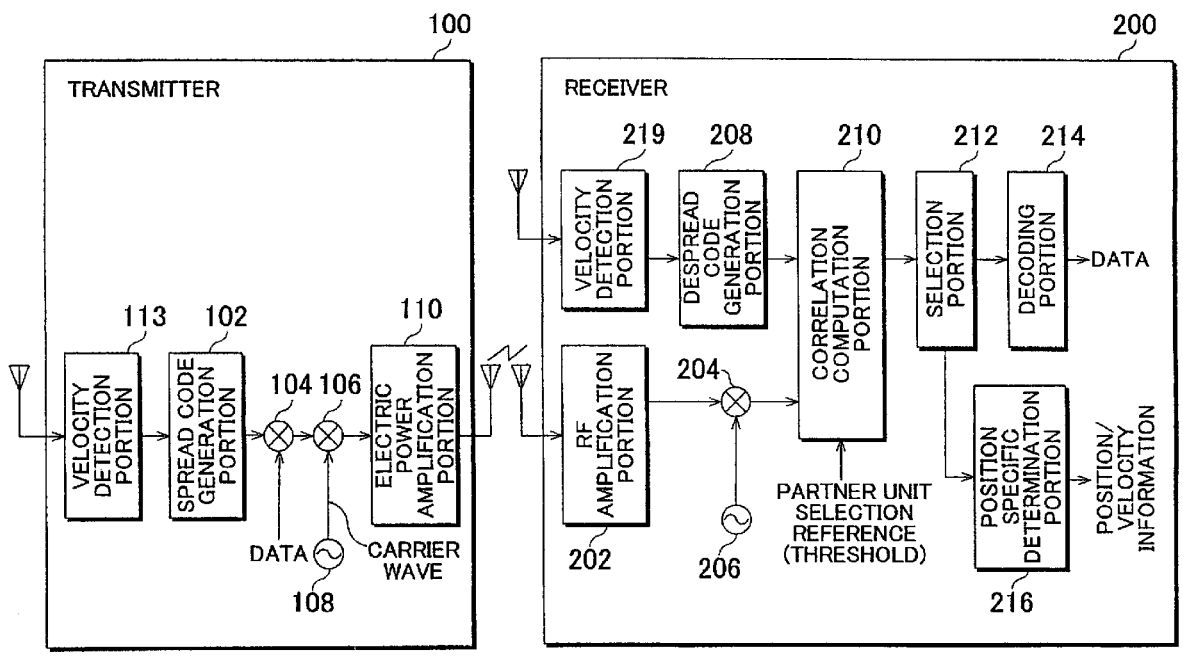
FIG. 8 is a partial block diagram showing a transmitter and a receiver in accordance with an embodiment of the invention.

Next, a wireless communication system in accordance with a third embodiment of the invention will be described with reference to FIG. 8.

The wireless communication system in accordance with this embodiment is a system based on the foregoing embodiments in which velocity information is applied as a parameter that corresponds to the condition for selecting a communication partner. A transmitter and a receiver in accordance with this embodiment are based on the transmitter 100 and the receiver 200 described above with reference to FIG. 4 in which velocity detection portions 113 and 219 are provided in place of the position detection portions 112 and 218.

The transmitter 100 in accordance with this embodiment will be described.

The velocity detection portion 113 detects a velocity of the host vehicle in which the transmitter 100 is mounted, and inputs the detected velocity information to a spread code generation portion 102. For example, the velocity detection portion 113 is constructed of a GPS receiver, and receives GPS signals transmitted from a plurality of artificial satellites, and measures the position and velocity of the host vehicle in which the transmitter 100 is mounted. Besides, the velocity detection portion 113 may also acquire velocity information from the host vehicle in which the transmitter 100 is mounted.

A spread code generation portion 102 generates a spread code on the basis of the input velocity information, and inputs the generated spread code to a spread process portion 104. The spread codes are required to be high in autocorrelation characteristic and low in crosscorrelation characteristic.

The receiver 200 in accordance with this embodiment will be described.

The velocity detection portion 219 detects the velocity of a host vehicle in which the receiver 200 is mounted, and inputs the detected velocity information to a despread code generation portion 208. For example, the velocity detection portion 219 is constructed of a GPS receiver, and receives GPS signals transmitted from a plurality of artificial satellites, and measures the position and velocity of the host vehicle in which the receiver 200 is mounted. Besides, the velocity detection portion 219 may also acquire velocity information from the host vehicle in which the receiver 200 is mounted.

the despread code generation portion 208 generates a despread code on the basis of the input velocity information, and inputs the generated despread code to a correlation computation portion 210. The process performed at this stage is performed by an algorithm similar to that of the aforementioned spread code generation portion 102.

The correlation computation portion 210 performs a correlation computation of an input base band signal and the input despread code, and inputs a result of the computation to a selection portion 212. For example, the correlation computation portion 210 is constructed of a matched filter. For example, the correlation computation portion 210 performs a correlation computation of the received signal from the transmitter 100 that is present around the host vehicle's receiver 200, and the despread code generated on the basis of the velocity of the host vehicle's receiver 200. The signal transmitted from the transmitter 100 is spread by the spread code that is generated on the basis of the velocity information regarding the transmitter 100. The despread code generated by the receiver 200 is a code generated on the basis of the velocity information regarding the receiver 200. Therefore, the closer the velocity of the transmitter 100 and the velocity of the receiver 200 are to each other, the higher the similarity between the code from the transmitter 100 and the code generated by the receiver 200 becomes, and therefore the higher the correlation degree becomes.

The selection portion 212 determines whether or not there is a need to perform communication with the transmitter 100 on the basis of whether or not the correlation degree input as described above is greater than or equal to a predetermined threshold value (partner unit selection threshold value) that is determined beforehand. For example, in the case where the communication purpose (condition) is the application of the system to the assistance in the detection regarding the rearward blind spots on expressways, concretely, in the case where the communication purpose (condition) is to extract an object vehicle in order to avoid the contact between vehicles on a multi-lane road, it is determined whether or not there is a need for communication with a vehicle on the basis of whether or not the vehicle velocity vector is within a condition range from the velocity vector of the host vehicle, in other words, the correlation degree is greater than or equal to a certain value. After that, the selection portion 212 detects a vehicle within a condition distance from the host vehicle, for example, by using an application program. Besides, in conjunction with an application program that needs the recognition of an oncoming vehicle, such as the AFS or the like, a vehicle whose velocity vector is within the condition range from the velocity vector of the host vehicle, that is, that makes the correlation degree greater than or equal to a certain value and less than or equal to a certain value, is detected.

Fourth Embodiment

Next, a wireless communication system in accordance with a fourth embodiment of the invention will be described.

The constructions of a transmitter 100 and a receiver 200 in accordance with this embodiment are substantially the same as the constructions described above with reference to FIG. 4. The functions of the transmitter 100 are substantially the same as the functions of the above-described transmitters.

The receiver in accordance with this embodiment will be described.

The correlation computation portion 210 performs a correlation computation of an input base band signal and a despread code input from a despread code generation portion 208, and inputs a result of the computation to a selection portion 212. For example, the correlation computation portion 210 is constructed of a matched filter. For example, the correlation computation portion 210 performs a correlation computation of the received signal from the transmitter that is present around the host vehicle's receiver 200, and the despread code generated on the basis of the position of the host vehicle's receiver 200. The signal transmitted from the transmitter 100 is spread by the spread code that is generated on the basis of the position information regarding the transmitter 100. The despread code generated by the receiver 200 is a code generated on the basis of the position information regarding the receiver 200. Therefore, the closer the position of the transmitter 100 and the position of the receiver 200 are to each other, the higher the similarity between the code from the transmitter 100 and the code generated by the receiver 200 becomes, and therefore the higher the correlation degree becomes. Furthermore, the correlation computation portion 210 computes a rate of change of the correlation degree. For example, a rate of change of the correlation degree in a short time of about several milliseconds is calculated. The correlation computation portion 210 inputs the calculated rate of change of the correlation degree to a selection portion 212.

Figure 9:
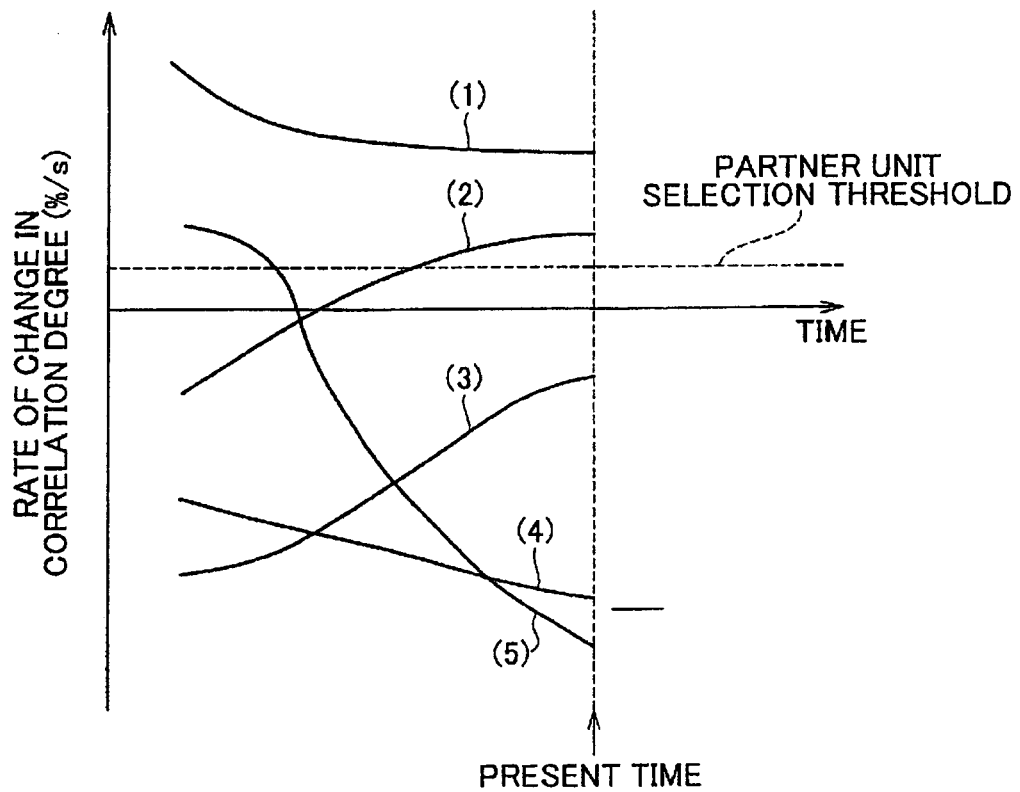
FIG. 9 is an illustrative diagram showing a process of selecting a transmitter that becomes a communication partner of the receiver in accordance with an embodiment of the invention.

The selection portion 212 determines whether or not there is a need to perform communication with the transmitter 100 on the basis of whether or not the rate of change of the correlation degree input as described above is greater than or equal to a predetermined threshold value that is determined beforehand. Herein, the partner unit selection threshold value is determined on the basis of whether or not the transmitter is approaching, in other words, whether or not the rate of change of the correlation degree is positive in sign. For example, in the case where a plurality of vehicles exist around the receiver 200 and signals are transmitted from the transmitters mounted in the vehicles, a rate of change of the correlation degree in a predetermined time corresponding to each transmitter is obtained from the correlation computation portion 210. The selection portion 212 selects a transmitter that has a correlation degree that is greater than or equal to a partner unit determination threshold value that is determined beforehand from the rate of changes of the correlation degrees of the vehicles. For example, in the case where five vehicles exist around the receiver 200 and signals are transmitted from the transmitter 100 mounted in the five vehicles, five rates of change of the correlation degree are obtained as shown in FIG. 9. In this case, the selection portion 212 selects transmitters that provide correlation degrees that are greater than or equal to a partner unit selection threshold value, concretely, selects transmitters that correspond to rates of change (1) and (2) in FIG. 9. After that, communication is established with respect to the selected transmitters. The selection portion 212 inputs to a demodulation portion 214 and a position specific determination portion 216 a received signal and a despread code of each of the transmitters 100 that have been determined to be transmitters that the host vehicle's receiver 200 needs to communicate with.

The rate of change of the correlation degree being positive in sign means that the vehicle equipped with the transmitter 100 is approaching the vehicle in which the receiver 200 is mounted. By selecting a transmitter 100 that the host vehicle's receiver 200 needs to communicate with on the basis of the rate of change of the correlation degree, a vehicle approaching the host vehicle can be detected. Besides, since the rate of change of the correlation degree is a value proportional to the approaching velocity, the approaching velocity can be simultaneously found by finding the rate of change of the correlation degree.

Fifth Embodiment

Next, a wireless communication system in accordance with a fifth embodiment of the invention will be described.

The constructions of a transmitter 100 and a receiver 200 in accordance with this embodiment are substantially the same as the constructions described above with reference to FIG. 4.

The transmitter 100 in accordance with this embodiment will be described.

Figure 10:
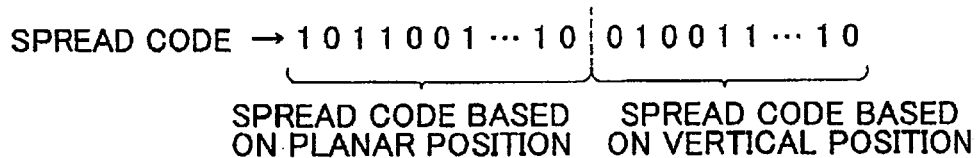
FIG. 10 is an illustrative diagram showing examples of a spread code and a despread code that are generated by a transmitter and a receiver in accordance with an embodiment of the invention.

A spread code generation portion 102 generates a spread code on the basis of the input position information, and inputs the generated spread code to a spread process portion 104. The spread codes are required to be high in autocorrelation characteristic and low in crosscorrelation characteristic. For example, the spread code generation portion 102 divides the input position information into information that shows the planar position thereof and information that shows the vertical position (altitude), and generates spread codes on the basis of the information regarding the planer position and the information regarding the vertical position (altitude). For example, the spread code generation portion 102 generates a spread code that contains a spread code generated on the basis of the planar position and a spread code generated on the basis of the vertical position as shown in FIG. 10. FIG. 10 shows an example case where the spread code generated on the basis of the planar direction and the spread code generated on the basis of the vertical position are continuously interlinked and placed side by side.

The spread process portion 104 spreads the transmit-data by using the input spread code, and inputs the transmit-data to a modulation process portion 106. The modulation process portion 106 performs carrier modulation with respect to the signal that has been subjected to the spread process, by using a carrier wave input thereto from a local oscillator 108, and inputs the carrier-modulated signal to an electric power amplification portion 110. The electric power amplification portion 110 performs electric power amplification with respect to the signal input thereto, and transmits the signal.

The receiver 200 in accordance with the embodiment will be described.

A despread code generation portion 208 generates a despread code on the basis of the input position information, and inputs the generated despread code to a correlation computation portion 210. The process performed at this stage is performed by an algorithm similar to that of the aforementioned spread code generation portion 102. For example, the despread code generation portion 208 generates a despread code that contains a despread code based on the planar position and a despread code based on the vertical position, similarly to the spread code described above in conjunction with FIG. 10.

The correlation computation portion 210 performs a correlation computation of an input base band signal and the despread code input by the despread code generation portion 208, and inputs a result of the computation to a selection portion 212. For example, the correlation computation portion 210 is constructed of a matched filter. For example, the correlation computation portion 210 performs a correlation computation of a received signal from a transmitter 100 present around the host vehicle's receiver 200, and a despread code generated on the basis of the vertical position of the host vehicle's receiver 200. The signal transmitted from the transmitter 100 is spread by the spread code generated on the basis of the planar position and the vertical position of the transmitter 100. The despread code generated by the receiver 200 contains the despread code generated on the basis of the vertical position of the receiver 200. Therefore, with regard to the spread code generated on the basis of the vertical position, the closer the vertical position of the transmitter 100 and the vertical position of the receiver 200 are to each other, the higher the similarity between the code from the transmitter 100 and the code generated by the receiver portion 200 becomes, and the higher the correlation degree becomes.

Next, the correlation computation portion 210 performs a correlation computation of the received signal from the transmitter 100 present around the host vehicle's receiver 200, and the despread code generated on the basis of the planar position of the host vehicle's receiver 200. The signal transmitted from the transmitter 100 is spread by the spread code generated on the basis of the planar position of the transmitter 100. The despread code generated by the receiver 200 contains the despread code generated on the basis of the planar position of the receiver 200. Therefore, the closer the planar position of the transmitter 100 and the planar position of the receiver 200 are to each other, the higher the similarity between the code from the transmitter 100 and the code generated by the receiver portion 200 becomes, and therefore the higher the correlation degree becomes.

Figure 11:
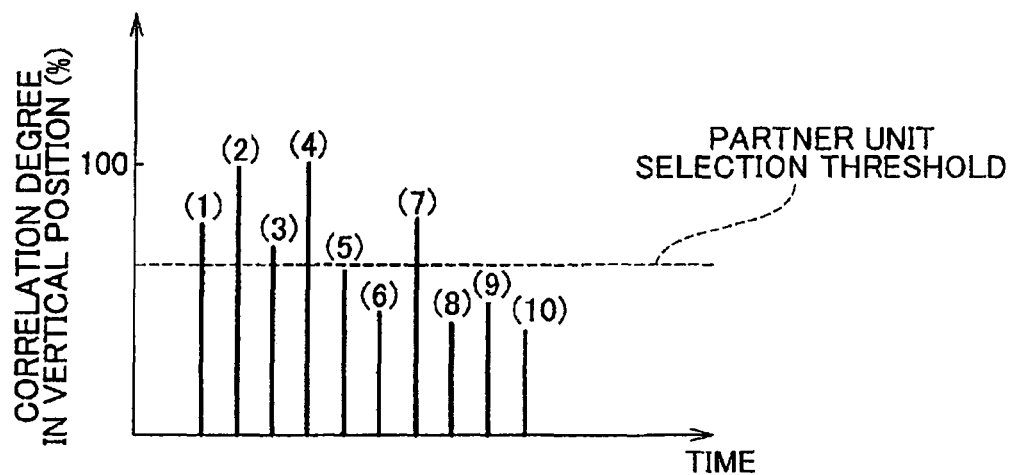
FIG. 11 is an illustrative diagram showing a process of selecting a transmitter that becomes a communication partner of the receiver in accordance with an embodiment of the invention.

The selection portion 212 determines whether or not the transmitter 100 is a communication device with which the host vehicle's receiver 200 needs to communicate, on the basis of whether or not the correlation degree in terms of the vertical position is greater than or equal to a predetermined partner unit selection threshold value in terms of the vertical position that is determined beforehand. It is to be noted herein that the partner unit selection threshold value is determined on the basis of the relative height or altitude of the transmitter with which the host vehicle's receiver 200 needs to communicate, in other words, on the basis of whether or not the vehicle in which the transmitter is mounted is traveling on the same road as the vehicle in which the receiver is mounted. For example, in the case where a plurality of vehicles exist around the receiver 200 and signals are transmitted from the transmitters mounted in the vehicles, the selection portion 212 obtains a correlation degree in the vertical position that corresponds to each transmitter, from the correlation computation portion 210. By checking the various correlation degrees of the transmitters of the vehicles, the selection portion 212 selects a transmitter that has a correlation degree that is greater than or equal to the partner unit determination threshold value in the vertical position that is predetermined beforehand. For example, in the case where ten vehicles exist around the receiver 200 and signals are transmitted from the transmitters 100 mounted in the ten vehicles, ten correlation degrees in the vertical position are obtained as shown in FIG. 11. In that case, the selection portion 212 selects a transmitter that has a correlation degree in the vertical position that is greater than or equal to a partner unit selection threshold value, concretely, selects transmitters corresponding to peaks (1), (2), (3), (4) and (7) in FIG. 11.

Figure 12:
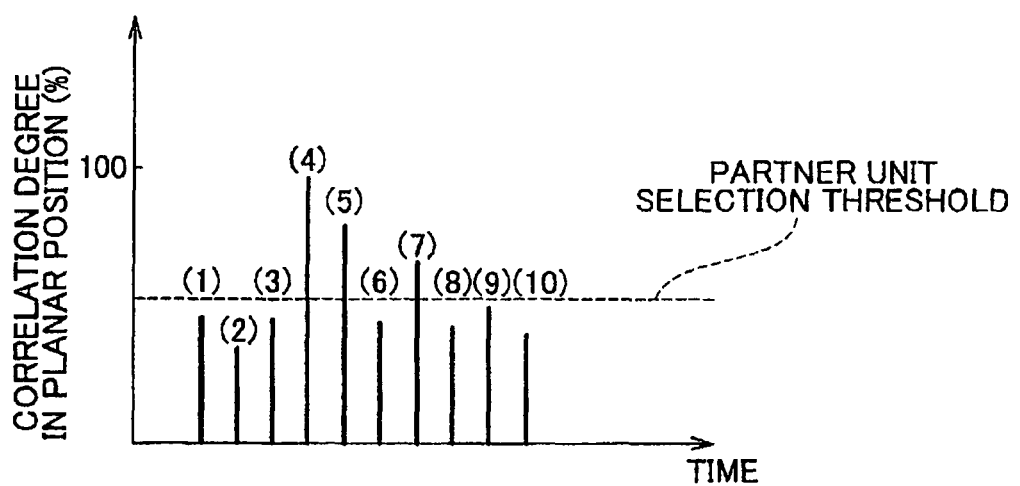
FIG. 12 is an illustrative diagram showing a process of selecting a transmitter that becomes a communication partner of the receiver in accordance with an embodiment of the invention.

Next, a correlation degree in the planar position that corresponds to each transmitter is obtained from the correlation computation portion 210. The selection portion 212 selects, from the transmitters selected on the basis of the correlation degree in the vertical position, a transmitter that has a correlation degree in the planar position that is greater than or equal to a predetermined partner unit determination threshold value, by checking the correlation degrees in the planar position of the transmitters. For example, in the case where the aforementioned ten vehicles exist around the receiver 200 and the transmitters of five of the receiver 200 have been selected on the basis of the correlation degree in the vertical position, one or more of the five transmitters whose correlation degrees in the planar position are greater than, or equal to the predetermined partner unit determination threshold value in the planar position are selected. In this case, the partner unit determination threshold value can be set at a correlation degree that corresponds to a condition distance from the host vehicle, for example, in the case where the communication purpose (condition) is merely to perform the monitoring of surroundings in which only surrounding vehicles are extracted. Besides, in the case where the communication purpose (condition) is to avoid collisions, such as an offset collision upon entering a corner, a setting may be made so that the need for communication is determined on the basis of whether or not the correlation degree is greater than or equal to a correlation degree that corresponds to the condition distance from the host vehicle and the input correlation degree has a rising tendency. Besides, in the case where the communication purpose (condition) is the application of the system to the assistance in the detection regarding the rearward blind spots on expressways, the need for communication may also be determined on the basis of whether or not the vehicle is within the condition distance from the host vehicle. For example, in the case where five transmitters are selected on the basis of the correlation degree in the vertical position as shown in FIG. 11 and the correlation degrees in the planar position are obtained as shown in FIG. 12, the selection portion 212 selects transmitters whose correlation degrees are greater than or equal to the partner unit selection threshold value, concretely, transmitters that correspond to (4) and (7). After that, communication is established with the selected transmitters.

Thus, the spread codes and the despread codes are generated separately for the planar position and the vertical position, and the transmitters whose correlation degrees in the vertical position are less than the partner unit selection threshold value in the vertical position are first excluded, and one or more transmitters with which the host vehicle's receiver communicates are selected from the transmitters other than the excluded transmitters on the basis of the correlation degree in the planar position. Therefore, it is possible to prevent false detection of a vehicle that is traveling on a road that is different in height or altitude from the road of the receiver 200 so that the collision with the vehicle cannot occur, for example, in the case where one of the vehicle and the host vehicle is traveling on an elevated road while the other is traveling on a road below the elevated road.

This embodiment has been described in conjunction with an example case where transmitters whose correlation degrees in the vertical position are less than a partner unit selection threshold value in the vertical position are first excluded, and one or more transmitters that the receiver communicates with are selected from the transmitters other than the excluded transmitters, on the basis of the correlation degree in the planar position. However, it is also permissible to adopt a construction in which transmitters whose correlation degrees in the planar position are less than a partner unit selection threshold value in the planar position are first excluded, and one or more transmitters that the receiver communicates with are selected from the transmitters other than the excluded transmitters, on the basis of the correlation degree in the vertical position.

Sixth Embodiment

Next, a wireless communication system in accordance with a sixth embodiment of the invention will be described.

The foregoing embodiments have been described in conjunction with the case where in the spread-spectrum communication, spread codes are generated on the basis of the position information or the velocity information, in other words, the position information or the velocity information is converted into a spread code, and then communication is automatically established on the basis of the generated spread code. Concretely, a spread code (despread code) generated by a unit is utilized to search for a spread code of another unit that is spatially near, and to specifically determine the spread code. In this case, as for the spread codes thus generated, in order to avoid interference therebetween, it is necessary that the crosscorrelation between different spread codes be low, and since the spectrum of the carrier wave is spread, randomness is needed. Due to these requirements, there arises a problem of insufficiency in the number of patterns of spread codes. Specifically, since there is a limit to the number of patterns of code strings that are suitable to the spread codes, the number of patterns becomes insufficient if the position information and the velocity information are directly allotted to spread codes. Besides, since the crosscorrelation between different spread codes is low, the spread codes generated on the basis of the position information do not makes it possible to detect the distance between the transmitter and the receiver on the basis of the correlation between the spread codes.

Therefore, in this embodiment, spread codes are generated so that spatial distance can be expressed as a phase difference between codes.

Figure 13:
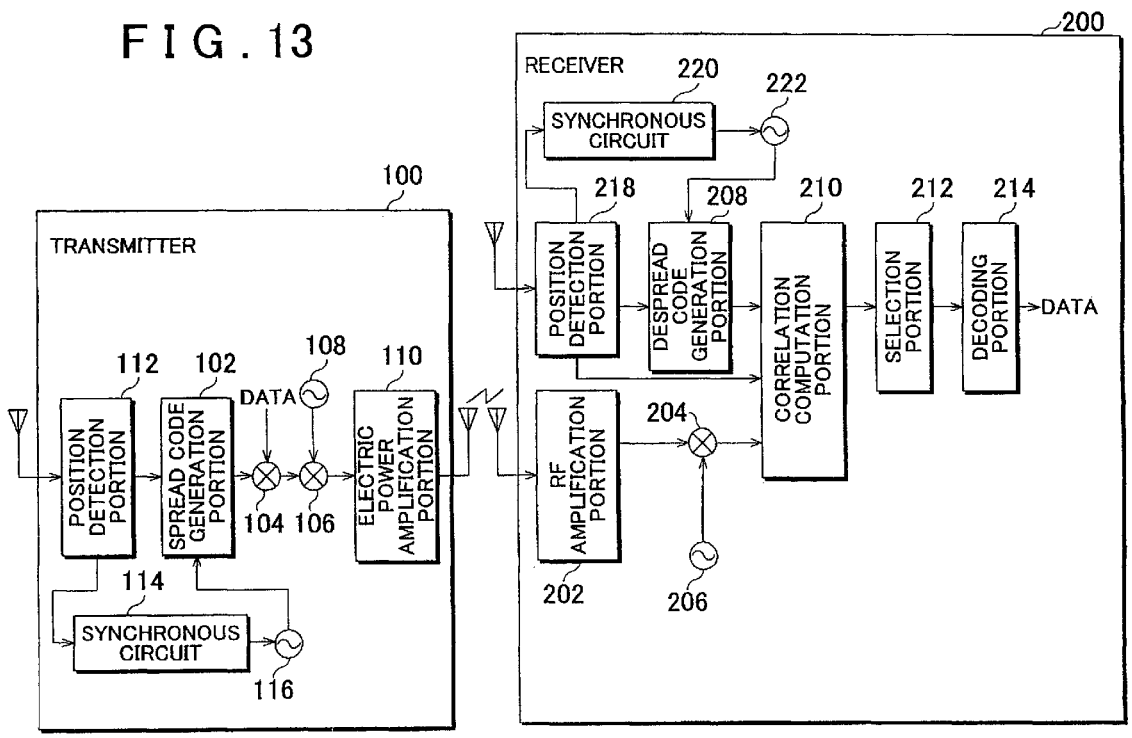
FIG. 13 is a partial block diagram showing a transmitter and a receiver in accordance with an embodiment of the invention.

A transmitter in accordance with this embodiment will be described with reference to FIG. 13.

The transmitter in accordance with this embodiment is based on the construction of the transmitter 100 described above with reference to FIG. 4, and also includes a synchronous circuit 114 to which an output signal of a position detection portion 112 is input, and a reference clock oscillator 116 to which an output signal of the synchronous circuit 114 is input. The output of the reference clock oscillator 116 is input to a spread code generation portion 102.

The position detection portion 112 detects the position of a host vehicle in which the transmitter 100 is mounted, and inputs the detected position information to the spread code generation portion 102. For example, position detection portion 112 is constructed of a GPS receiver, and receives GPS signals transmitted from a plurality of artificial satellites, and measures the position of the host vehicle in which the transmitter 100 is mounted. Besides, the position detection portion 112 acquires time information from an artificial satellite, and inputs the information to the synchronous circuit 114. For example, the position detection portion 112 inputs a PPS (Pulse Per Second) signal to the synchronous circuit 114.

The synchronous circuit 114 generates a synchronizing signal on the basis of the input time information, and inputs the synchronizing signal to the reference clock oscillator 116. The reference clock oscillator 116, following the input synchronizing signal, inputs a reference clock to the spread code generation portion 102.

Figures 14, 15:
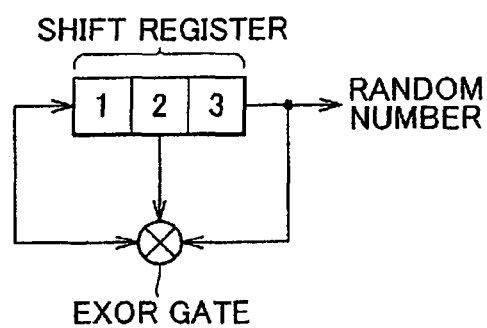
FIG. 14 is an illustrative diagram showing a 3-bit shift register that generates PN codes.
FIG. 15 is a table of correspondence between a register initial value and information representing remoteness/nearness of position in accordance with an embodiment of the invention.

The spread code generation portion 102 generates a spread code on the basis of the input position information, and inputs the generated spread code to the spread process portion 104. The spread code generation portion 102 inputs the spread code to the spread process portion 104 synchronously with the reference clock input from the reference clock oscillator 116. The spread codes are required to be high in autocorrelation characteristic and low in crosscorrelation characteristic. This embodiment will be described in conjunction with the case where the spread codes that satisfy the foregoing property requirements or the like are of an M (maximum length) sequence. However, the code sequence used herein may also be different from the M sequence as long as the code sequence used herein satisfies the aforementioned characteristics. The M sequence can be generated by an exclusive-or gate as shown in FIG. 14. FIG. 14 shows an example of a generation method for generating seven kinds of sequence, in other words, a generation method of the 3-bit M sequence. In this generation method, if a certain initial value is given to a shift register, values are automatically output, one at a time. For example, if 001 is given as an initial value, then the value of the register becomes 100, and 1 is output, as shown in FIG. 15. Next, the value of the register becomes 010, and 0 is output. This process is repeatedly performed until the value of the register becomes the initial value. Finally, the code becomes 1001011.

In this embodiment, as shown in FIG. 15, the initial value of the register and the information that represents the distance of the position are arranged so as to correspond to each other. Specifically, the placement in order in the distance of the position is allotted to the placement in the order in the register. In FIG. 15, the code sequence having 001 as an initial value and the code sequence having 100 are different from each other by "1" in the placement in the order, which means that the two code sequences are different in phase by "1". In the embodiment, the phase of the spatial distance is caused to correspond to the phase of the spread code. For example, the position information and the initial value are caused to correspond to each other so that vehicles closer in space to each other are represented by the spread codes of the vehicles being closer in phase to each other. The spatial position and the spread code are caused to have a one-to-one correspondence therebetween. Besides, all the codes are different only in phase, and are the same in succession. In this case, too, the requirements about the crosscorrelation characteristic and the autocorrelation of codes of the spread spectrum communication mode are satisfied. Through the operation in this manner, the distance can be expressed as a phase difference of the generated code sequences.

Figure 16:
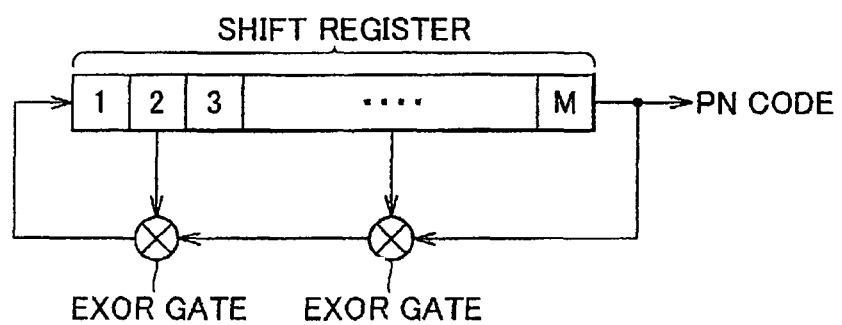
FIG. 16 is an illustrative diagram showing an M-bit shift register that generates PN codes.

The spread code generation portion 102 performs the bit conversion of the input position information, that is, converts the information into a binary number, and finds a one-dimensional bit sequence following a predetermined mapping. For example, in the case where the position information is P(X, Y, Z), the spread code generation portion 102 converts the position information into a binary number P'(X', Y', Z'), and finds a corresponding register initial value through a mapping f of the thus-obtained P'(X', Y', Z'). The bit length of the register initial value is equal to the maximum sequence length of the binary number P' between the elements. Herein the coordinate system used for the conversion of the position information into P(X, Y, Z) may be any coordinate system as long as X, Y, Z are on the same scale. For example, the WGS (World Geodetic System)-84 system used in the GPS can be used. For example, the mapping f is a mapping in which successive quantities (A) are caused to correspond to the register values (B) of the M sequence in the order of operation. For example, in the case where the mapping f as shown in FIG. 15 is given, A=2(010) associates with B=4(100), where the parenthesized numbers are binary numbers. Specifically, A=2(010) is caused to correspond to B=4(100). The spread code generation portion 102 sets a register initial value in the register, and generates a spread code. For example, in the case where the register initial value is expressed by M bits (M is an integer greater than zero), a PN code (spread code) can be generated by an M-bit shift register as shown in FIG. 16.

Figure 17:
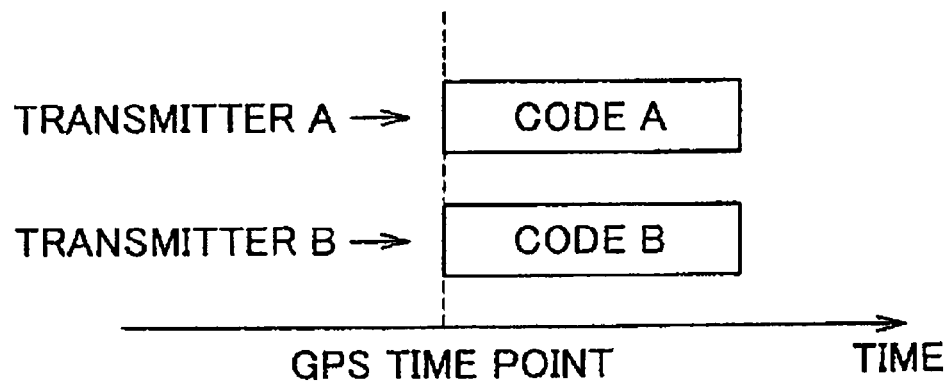
FIG. 17 is an illustrative diagram showing a spread code that is synchronously generated in the transmitter.

The spread code generation portion 102 inputs the generated spread code to the spread process portion 104, following the synchronizing signal input from the reference clock oscillator 116. As a result, in each of transmitters, for example, each of transmitters A and B, a corresponding one of spread codes A and B is input from the spread code generation portion 102 to the spread process portion 104 synchronously with a certain time, for example, a GPS time, as shown in FIG. 17. As a result, transmit-data is synchronously transmitted from the transmitters.

The spread process portion 104 spreads the transmit-data by the input spread code, and inputs the spread transmit-data to a modulation process portion 106. The modulation process portion 106 performs carrier modulation with respect to the signal that has been subjected to the spread process, by using a carrier wave input thereto from a local oscillator 108, and inputs the carrier-modulated signal to an electric power amplification portion 110. The electric power amplification portion 110 performs an electric power amplification on the input signal, and transmits the amplified signal.

Figure 18:
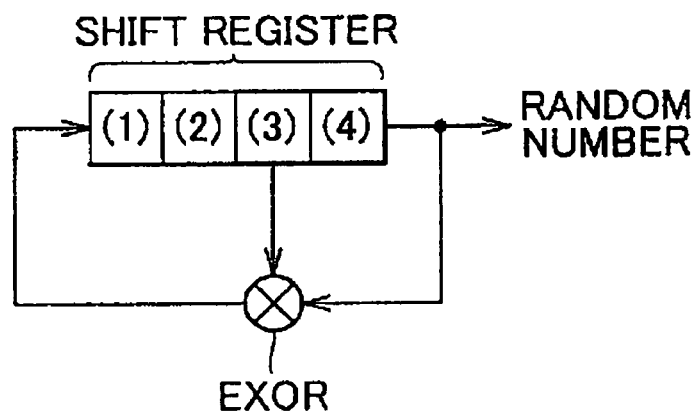
FIG. 18 is an illustrative diagram showing a 4-bit shift register that generates PN codes.
Figures 19, 20:
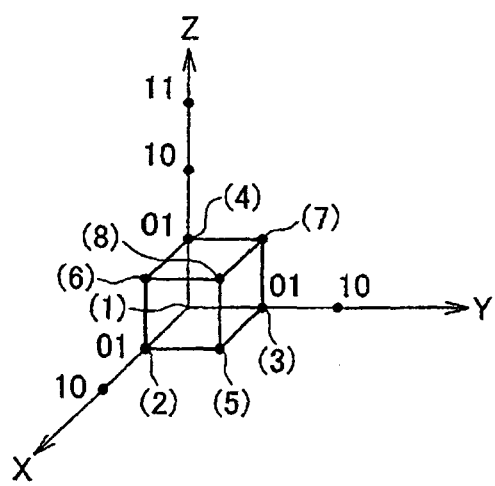
FIG. 19 is a table of correspondence between a register initial value and information representing remoteness/nearness of position in accordance with an embodiment of the invention.
FIG. 20 is an illustrative diagram showing position information that is made to correspond to the M-sequence register.
Figure 21:
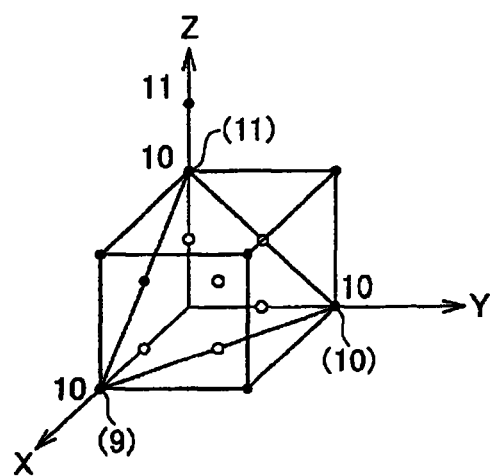
FIG. 21 is an illustrative diagram showing position information that is made to correspond to the M-sequence register.
Figure 22:
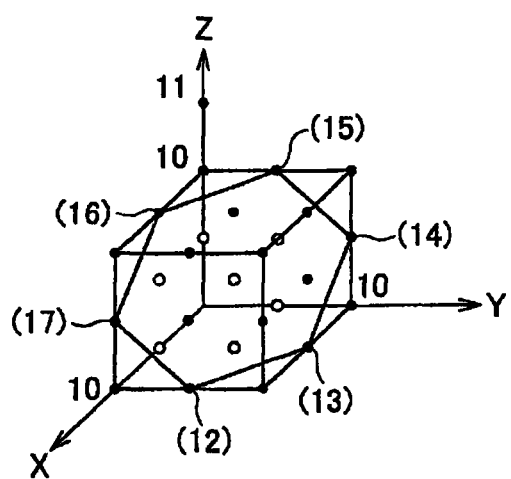
FIG. 22 is an illustrative diagram showing position information that is made to correspond to the M-sequence register.
Figure 23:
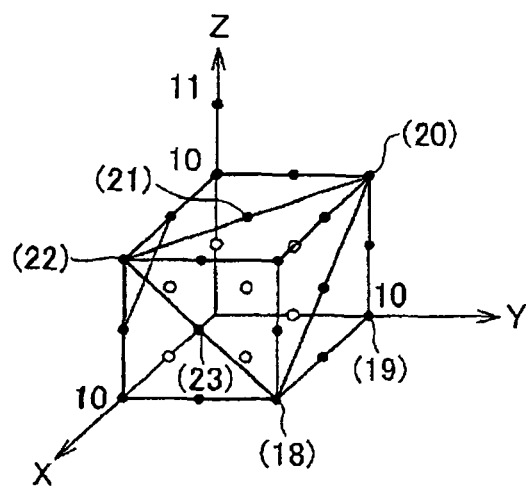
FIG. 23 is an illustrative diagram showing position information that is made to correspond to the M-sequence register.
Figure 24:
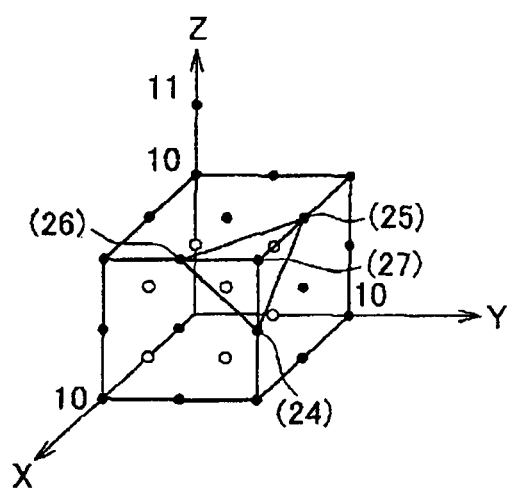
FIG. 24 is an illustrative diagram showing position information that is made to correspond to the M-sequence register.

Herein, an example of a spread code generation process performed by the spread code generation portion 102 will be described in detail. The spread code generation portion 102 generates a spread code on the basis of the input position information as described above. Using an example of a 4-bit M sequence, a method in which a spread code is generated by performing the bit conversion into binary number and taking a mapping. In this case, using a 4-bit shift register as shown in FIG. 18, a PN code can be generated. The PN code has 15 digits. The spread code generation portion 102 makes the spatial extent of the position information correspond to the M-sequence register, following a correspondence table of the position information and an M-sequence register as shown in FIG. 19. For example, each lattice point is made to correspond to an M-sequence register. Concretely, given lattice points as shown in FIG. 20, for example, (X, Y, Z)=(01, 01, 00) corresponds to a register initial value (register Q)=(1001). In the case where (X, Y, Z) have the same bit length, for example, a bit length of 2, the lattice points of a cube shown in FIG. 20 can be assigned with registers Q in the order of (1)-(8). That is, performing the bit conversion and finding a mapping can be said to be making spatial phases (magnitude of distance) correspond to the order of M-sequence registers. Furthermore, as shown in FIGS. 21 to 24, lattice points can be made to correspond to M-sequence registers in the order of (9)-(27). While the foregoing description is made in conjunction with the three dimensions of X, Y, Z, a planar phase with regard to two dimensions of X, Y may be made to correspond to the order of M-sequence registers. Besides, this embodiment can also be applied to one dimension. Besides, the location of the point of origin is arbitrary. Although the foregoing description has been made in conjunction with (1)-(27), more numbers of registers can be found through the correspondence with lattice points.

For example, at clock 5, (X, Y, Z)=(01, 01, 00) is given, and the initial register in the M sequence (register Q) becomes (1001). Therefore, the PN code becomes (100110101111000). Besides, for example, at clock 6, (X, Y, Z)=(01, 00, 01) is given, and the initial register in the M sequence (register Q) becomes (1100). Therefore, the PN code becomes (001101011110000). In this case, the phase between the codes is 1.

By making the position information correspond to the M-sequence register in the foregoing manner, the spatial distance, that is, the distance from the point of origin, can be expressed by the phase of the code.

A receiver in accordance with this embodiment will be described with reference to FIG. 13.

The receiver in accordance with this embodiment is based on the construction of the receiver 200 described above with reference to FIG. 4, and includes a synchronous circuit 220 to which an output signal of a position detection portion 218 is input, and a reference clock oscillator 222 to which an output signal of a synchronous circuit 220 is input. The output of the reference clock oscillator 222 is input to a despread code generation portion 208.

The position detection portion 218 detects the position of a host vehicle in which the receiver 200 is mounted, and inputs the detected position information to the despread code generation portion 208. For example, the position detection portion 218 is constructed of a GPS receiver, and receives GPS signals transmitted from a plurality of artificial satellites, and measures the position and velocity of the host vehicle in which the receiver 200 is mounted. Besides, the position detection portion 218 acquires time information from an artificial satellite, and inputs the acquired time information to a synchronous circuit 220. For example, the position detection portion 218 inputs a PPS signal to the synchronous circuit 220.

The synchronous circuit 220 generates a synchronizing signal on the basis of the input time information, and inputs the synchronous signal to the reference clock oscillator 222. The reference clock oscillator 222 inputs a reference clock to the despread code generation portion 208, in accordance with the input synchronizing signal.

The despread code generation portion 208 generates a despread code on the basis of the input position information, and inputs the generated despread code to a correlation computation portion 210 in accordance with the reference clock input from the reference clock oscillator 222. The process performed at this stage is performed by an algorithm similar to that of the aforementioned spread code generation portion 102.

The correlation computation portion 210 performs a correlation computation of an input base band signal and the input despread code input from the despread code generation portion 208, and inputs a result of the computation to a selection portion 212. For example, the correlation computation portion 210 is constructed of a matched filter as shown in FIG. 25. FIG. 25 shows a transposed FIR (Finite Impulse Response) filter as an example of the correlation computation portion 210. For example, the correlation computation portion 210 performs a correlation computation of the received signal from a transmitter located around the host vehicle's receiver 200 and a despread code generated on the basis of the position of the host vehicle's receiver 200. The signal transmitted from the transmitter 100 is spread by the spread code generated on the basis of the position information of the transmitter 100, and the despread code generated by the receiver 200 is a code generated on the basis of the position information of the receiver 200. These codes have been provided for making the spatial phase (magnitude of distance) correspond to the order of M-sequence registers. Therefore, the one-cycle bit positions of the spread code and the despread code are subjected to the exclusive-or (XOR) operation, and the bits given "0" as a result of the XOR operation, that is, the bits with the compared bit values being equal, are assigned with "+1", and the bits given "1" as a result of the XOR operation, that is, the bits with the compared bit values being different, are assigned with "−1". This operation process is sequentially performed while one of the codes is being rotated by one bit at a time. In the case where two codes are the same in bit position, which means all the bits of the two codes are equal to each other, each bit position is given "+1", and therefore the correlation degree becomes maximum. In the other cases, however, the correlation degree is −1 or a value close to −1. For example, in the correspondence table of the position information and the M-sequence registers described with reference to FIG. 19, in the case where the initial register of the M sequence is (0001), in other words, in the case of clock 1, the PN code is (1000100110101111). Besides, in the case where the initial register of the M sequence is (1000), in other words, in the case of clock 2, the PN code is (0001001101011111). The correlation computation portion 210 calculates a correlation degree between the PN code (1000100110101111) and the PN code (0001001101011111), and outputs the correlation degree. For example, in this case, the correlation degree is calculated to be "−1" since the number of matched bits is seven and the number of mismatched bits is eight. Thus, the value "−1" is output. If attention is focused on the order of the M-sequence registers, it can be understood that if the two codes are different in order by 1, the phases of the codes are different by 1. In this case, too, the condition required of the code sequences that the code sequences be low in crosscorrelation and high in autocorrelation is satisfied. In this embodiment, since the correlation computation of the signal spread by the spread code generated in accordance with the reference clock input from the reference clock oscillator 116 and the despread code input in accordance with the reference clock input by the reference clock oscillator 222 is performed, the correlation computation is performed with the transmitter 100 and the receiver 200 being synchronous. Therefore, the distance between the transmitter 100 and the receiver 200 manifests itself as a phase difference between the spread code generated by the transmitter 100 and the despread code generated by the receiver 200. The codes are different from each other merely in phase, but are the same as codes. Therefore, as a result of performing the correlation computation of the received signal from the transmitter 100 located around the host vehicle's receiver 200 and the despread code generated on the basis of the position of the host vehicle's receiver 200, the correlation computation portion 210 detects the distance between the transmitter 100 and the receiver 200 as a phase difference as shown in FIG. 26, and a peak of the correlation value appears corresponding to the phase difference. Besides, peaks of the correlation value appear at every predetermined period, for example, every $2^k-1$ bits. In this expression, k shows the number of bits of the binary-converted position information, and is an integer greater than 0.

The selection portion 212 determines whether or not there is a need to communicate with the transmitter 100 that corresponds to a peak in the correlation degree, on the basis of the distance that corresponds to the phase difference at which the peak in the correlation degree is detected. For example, the selection portion 212 determines whether or not there is a need to communicate with the transmitter 100 on the basis of whether or not the phase difference at which the peak in the correlation degree is detected is within a collision risk region, as shown in FIG. 26. The collision risk region is determined on the basis of the relative distance to the transmitter that the receiver itself needs to communicate with. The transmitter corresponding to the peak within the collision risk region means a transmitter that is near the receiver itself, and brings about the determination that there is a need to perform communication with priority given. For example, as shown in FIG. 26, in the case where a plurality of vehicles exist around the receiver 200 and signals are transmitted from, for example, the transmitters A, B and C mounted in those vehicles, peaks in the correlation degree corresponding to the transmitters are detected by the correlation computation portion 210. For example, peaks A, B and C are detected corresponding to the transmitters A, B and C. The selection portion 212 selects a transmitter if the phase difference of the transmitter at which the corresponding peak in the correlation degree has been detected is within the collision risk region. In FIG. 26, the transmitter A is selected. After that, communication is established with the selected transmitters. According to FIG. 26, since $C_1 < C_2$, the transmitter A is spatially closer to the receiver 200 than the transmitter B is.

Thus, since the spread code and the despread code are generated by making the position information regarding the transmitter 100 and the receiver 200 correspond to the order of the M-sequence registers, the distance between the transmitter 100 and the receiver 200 can be discerned as a phase difference between the codes. Besides, by discerning the phase difference between the receiver and the transmitter, communication can be selectively established on the basis of the spatial distance (nearness). Besides, since spread codes (PN codes) can be dynamically and automatically allotted to the transmitter 100 and the receiver 200, the control and management of the allocation of codes is not necessary, and codes can be used simultaneously by many units. Besides, since the phase difference between codes shows the spatial distance, synchronization acquisition can be carried out early between units that are spatially near to each other, and the synchronization acquisition requires a longer time between units spatially remote from each other than between units spatially near to each other. Besides, since the phase difference between codes shows a spatial distance, it suffices for the receiver 200 to selectively receive a transmitter that has the smallest phase difference among the transmitters. Thus, the selective reception, factoring in collisions and the like, can be performed at a signal process level. Furthermore, in the case where the receiver 200 communicates with only transmitters located near the receiver 200, the closer in space the devices are to each other, the closer in phase the codes of the devices are to each other, so that the reception can be established, starting with the transmitter mounted in a vehicle located near the receiver itself. Thus, if the communication is limited to the communication with transmitters located nearby, there is no need to perform a search for one period in the synchronization acquisition. That is, there is no need to take into consideration the time of synchronization acquisition based on the code length. Besides, the positions of transmitters can be specifically determined from codes, as in the foregoing embodiments. Besides, since the codes possessed by units are the same in succession, the synchronization acquisition and the decoding can always be carried out.

Besides, by finding a differential value of the phase difference, it can be discerned whether the transmitter is approaching or moving away.

Next, a communication method used in a wireless communication system in accordance with this embodiment will be described with reference to FIG. 27.

The transmitter 100 acquires position information (step S2702). As for the position information to be acquired, information about a three-dimensional position showing a position in space may be acquired, or information about a two-dimensional position showing a position in plane may be acquired. Besides, a number of significant digits may be set beforehand, and all the digits to the right of the last significant digit may be discarded. By setting the number of significant digits, a spatial resolution can be determined.

The transmitter 100 performs a bit conversion of the acquired position information (step S2704).

On the basis of the bit-converted position information, the transmitter 100 finds a register value that correspond to the bit-converted position information, by referring to the table of correspondence between the position information and the M-sequence register described above with reference to FIG. 19 (step S2706). The found register value is determined as an initial register.

The transmitter 100 sets the initial register in the shift register, and acquires a spread code (code sequence) respectively for each initial register (step S2708).

The transmitter 100 spreads the transmit-data by the acquired code sequence (step S2710), and transmits the data (step S2712).

On the other hand, the receiver 200 acquires position information (step S2714). As for the position information to be acquired, information about a three-dimensional position showing a position in space may be acquired, or information about a two-dimensional position showing a position in plane may be acquired. Besides, a number of significant digits may be set beforehand, and all the digits to the right of the last significant digit may be discarded. By setting the number of significant digits, a spatial resolution can be determined.

The receiver 200 performs a bit conversion of the acquired position information (step S2716).

On the basis of the bit-converted position information, the receiver 200 finds a register value that corresponds to the bit-converted position information, by referring to the table of correspondence between the position information and the M-sequence register described above with reference to FIG. 19 (step S2718). The found register value is determined as an initial register.

The receiver 200 sets the initial register in the shift register, and acquires a spread code (code sequence) respectively for each initial register (step S2720).

The receiver 200 receives data transmitted by the transmitter 100 (step S2722).

The receiver 200 finds a correlation between the received data and the generated code sequence, and thereby finds a phase difference therebetween (step S2724).

On the basis of the found phase difference, the receiver 200 determines whether or not to communicate with the transmitter 100 (step S2726).

Alternatively, the receiver may calculate a differential value of the phase difference, and may find a time-dependent amount of change in the differential value to find a relative velocity between the two devices, and may determine whether or not to communicate with the transmitter on the basis of the relative velocity.

Figure 27:
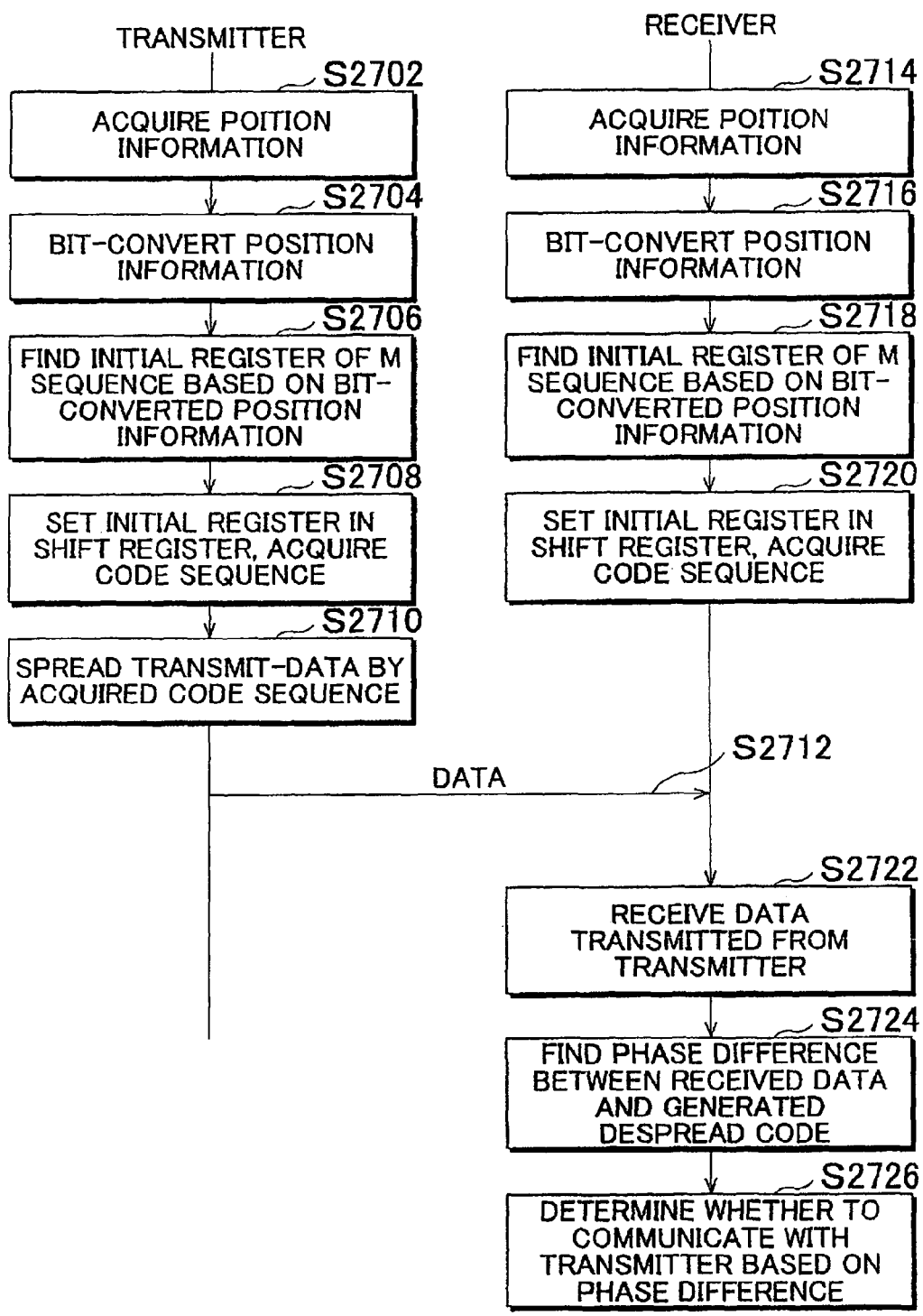
FIG. 27 is a flowchart showing an operation of a transmitter and a receiver in accordance with an embodiment of the invention.
Figure 28:
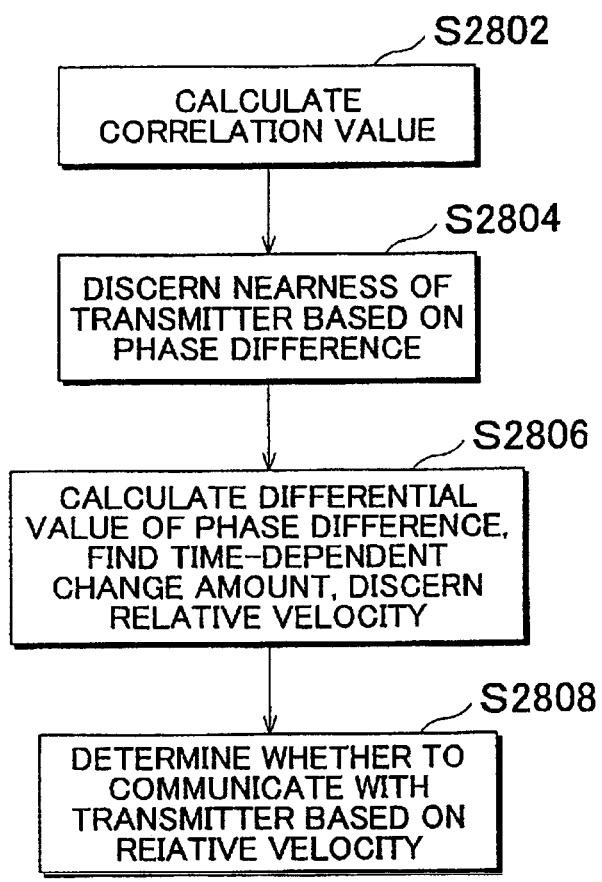
FIG. 28 is a flowchart showing an operation of a receiver in accordance with an embodiment of the invention.

For example, in a process as shown in FIG. 28 that follows step 2722 in FIG. 27, the receiver calculates a correlation value (step S2802).

The receiver 200 discerns the nearness (distance) of the transmitter 100 on the basis of the phase difference (step S2804). For example, the receiver 200 finds a phase difference that corresponds to a correlation value (peak position) that is greater than or equal to a predetermined correlation value, and finds a corresponding distance to the transmitter on the basis of the phase difference. For example, it is determined whether or not the phase difference is within the above-described collision risk region. It is also permissible to adopt a construction in which the distance to the transmitter corresponding to the phase difference is found if the phase difference is within the collision risk region.

The receiver 200 calculates a differential value of the phase difference, and finds a time-dependent amount of change in the differential value to find a relative velocity, and then discerns the relative velocity (step S2806). Through the operation in this manner, the receiver 200 can determine whether or not the transmitter 100 is approaching or moving away.

The receiver 200 determines whether or not to communicate with the transmitter on the basis of the relative velocity (step S2808).

Although the embodiment has been described in conjunction with the case where the bit-converted position information is two-digit information, the number of digits of the position information increases with increases in the distance between the transmitter 100 and the receiver 200. For example, in the case where X as a component of the position information has a bit length of 22 digits, a shift register that has 22 registers is needed in order to create a spread code even if the position information has only one dimension of X. If the position information has two dimensions of X and Y, a shift register having 44 registers is needed, and the code length becomes $2^{44}$. From the viewpoint of reducing the number of digits of the position information, it is preferable to adjust the spatial resolution. For example, the position information is made compressible if the communication partner is in a spatially nearby region. Besides, the information may also be compressible according to the bit length. Concretely, 001, 010, 011 and 100 are compressed to 001. In this case, the transmitter is constructed so as to have transmitter resolution adjustment means for adjusting the resolution of the position information about the transmitter, and the receiver is constructed so as to have receiver resolution adjustment means for adjusting the resolution of the position information about the receiver.

Besides, using a plurality of existing electronic reference points as origins, spatial divisions may be provided. An electronic reference point herein represents the location of a reference point that is prepared by, for example, the Geographical Survey Institute in Japan, in order to perform accurate measurement upon receiving GPS electromagnetic waves, that is a point whose position information is known. There are about 1200 electronic reference points in Japan, and the positions thereof are disclosed to public. Thus, the electronic reference points can easily be utilized. Using such electronic reference points as origins, it becomes possible to curb the code length.

According to this embodiment, the distance (remoteness/nearness) of a vehicle relative to the host vehicle can be detected at the level of signal processing.

Seventh Embodiment

Next, a wireless communication system in accordance with a seventh embodiment of the invention will be described.

The constructions of a transmitter 100 and a receiver 200 in accordance with this embodiment are substantially the same as the constructions described above with reference to FIG. 13. In the case where a vehicle in which the transmitter 100 is mounted and a vehicle in which the receiver 200 is mounted are moving, both the transmitter 100 and the receiver 200 change in position, and therefore the PN codes also change. Therefore, the code used by the transmitter 100 and the code used by the receiver 200 need to be synchronized in a state where the codes are matched. Therefore, the receiver 200 in accordance with this embodiment retains the synchronism by causing the phase fluctuations to be followed by the information obtained from the GPS system. Specifically, the phase difference between the transmitter 100 and the receiver 200 is estimated, and is tracked.

According to the related art, a circuit that performs the synchronism retention (DLL: Delay-Locked Loop) actually measures the error amount in the phase, and applies a voltage proportional to the error amount to a voltage control portion so as to amend the length of one clock.

Figure 29:
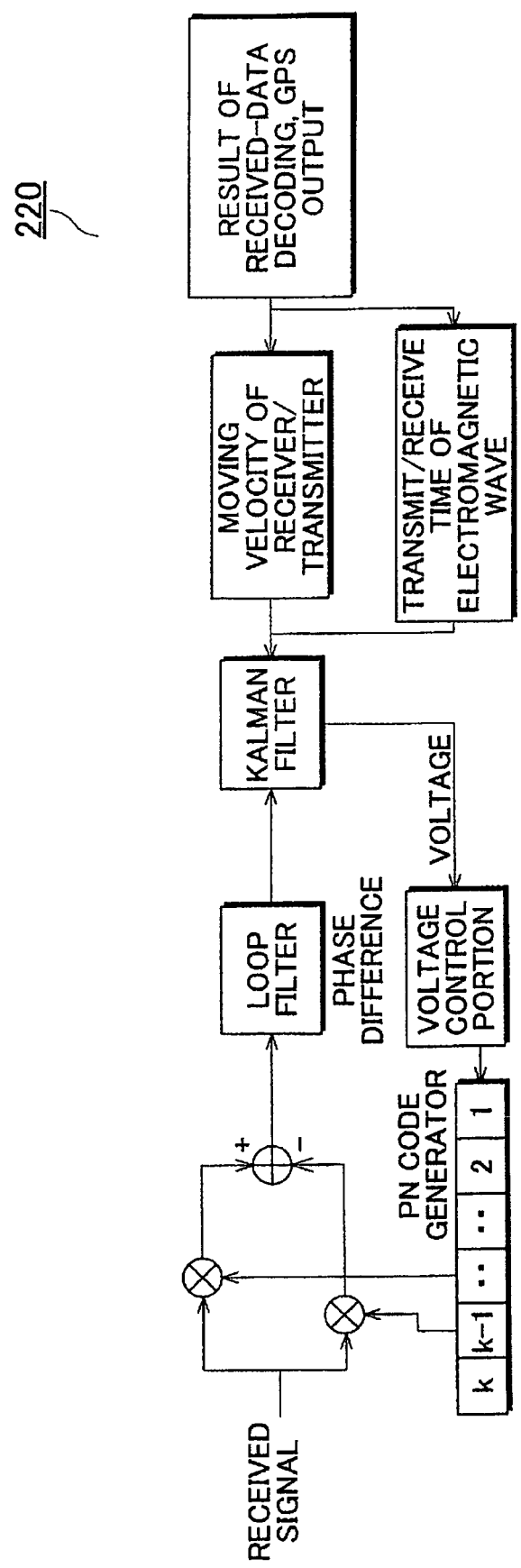
FIG. 29 is a block diagram showing a synchronous circuit in accordance with an embodiment of the invention.

The synchronous circuit 220 in accordance with this embodiment will be described with reference to FIG. 29.

In the transmitter 100, a "transmit time (a timing at which transmission of signal is started)" of the transmitter 100 and a "velocity" of the vehicle in which the transmitter 100 is mounted are added as a header of the transmit-data.

The position detection portion 218 of the receiver 200 finds a "reception time" of the data transmitted from the transmitter 200, and a "velocity" of the vehicle in which the receiver 200 is mounted.

A loop filter of the synchronous circuit 220 is constructed of a DLL circuit, and actually measures and calculates a phase difference amount A of the received signal. The calculated phase difference amount A is input to a Kalman filter.

In the meantime, the moving velocities of the receiver 200 and the transmitter 100, and the transmit time and the reception time of electromagnetic waves are obtained from the result of the decoding of the received data and the information obtained from the GPS. From the thus-obtained information, the reach time of electromagnetic waves from the transmitter 100 to the receiver 200 and the relative velocity between the transmitter 100 and the receiver 200 are obtained. The synchronous circuit 220 calculates a phase difference amount B from the reach time of electromagnetic waves and the relative velocity, and inputs the phase difference amount B to the Kalman filter.

The Kalman filter estimates a phase difference amount between the transmitter 100 and the receiver 200 on the basis of the input phase difference amount A and the input phase difference amount B, and inputs the estimated phase difference amount to a voltage control portion. The voltage control portion alters the time width of a pulse in the case where a PN code (spread code) is generated on the basis of the input phase difference amount. Through the operation in this manner, the synchronous circuit 220, being synchronous with the GPS, can accurately find the electronic wave reach time. Besides, since the generated spread codes are codes that are different only in phase, that is, the quantity of state is one variant, the synchronization acquisition/retention can be performed by the Kalman filter.

Eighth Embodiment

Next, a wireless communication system in accordance with an eighth embodiment of the invention will be described.

The constructions of a transmitter 100 and a receiver 200 in accordance with this embodiment are substantially the same as the constructions described above with reference to FIG. 4.

Figures 30, 31:
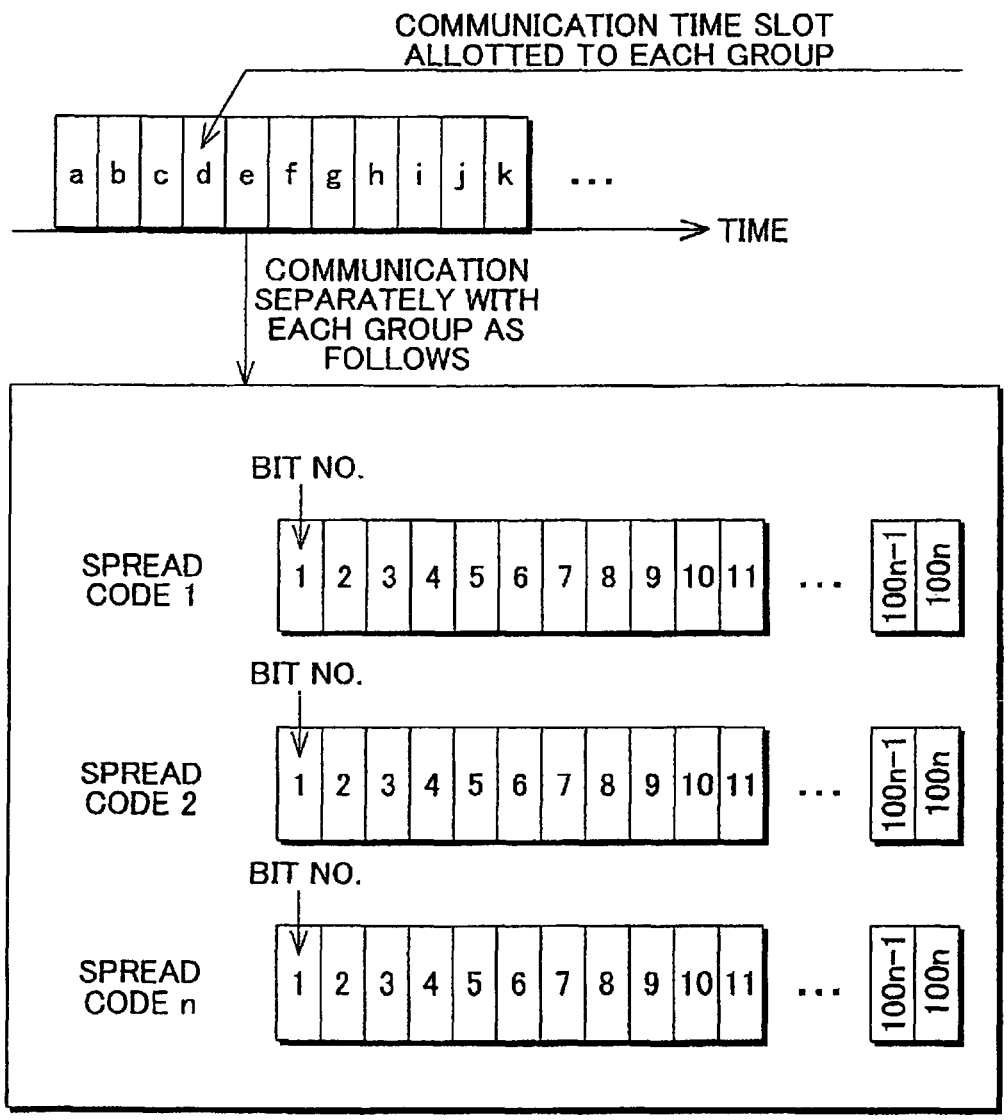
FIG. 30 is an illustrative diagram showing an example of data transmitted by a transmitter in accordance with an embodiment of the invention.
FIG. 31 is an illustrative diagram showing a spread code generation process in accordance with an embodiment of the invention.

The transmitter 100 performs communication in communication time slots allotted to the transmitter itself according to a time division multiple access mode. Therefore, each communication time slot is used by one or more transmitters (transmitter group) as shown in FIG. 31. In the case where one communication time slot is used by a plurality of transmitters, the transmitters spread their respective transmit-data by using different spread codes (spread codes 1, 2, . . . , n) (n is an integer>0). In this case, the spread codes 1, 2, . . . , n are set beforehand. That is, the spread codes are unique values of the individual communication devices 100. The pre-set spread codes satisfy the condition that the spread codes need to meet, for example, the condition that the autocorrelation characteristic be high and the crosscorrelation characteristic be low, and the like.

The spread code generation portion 102 alters the pre-set spread code on the basis of the input position information. For example, the value of at least one of a plurality of bits that constitute the pre-allotted spread code is altered on the basis of the value of at least one of plurality of bits that show the position information. As an example, the case where the number of digits of the spread code 1 is 100 n and the position information is expressed by n number of digits will be described with reference to FIG. 32. For example, in the case where the value of at least one bit is altered on the basis of the value that corresponds to the bit No. 1, if the value of the bit No. 1 in the bit data that shows the position information is "1", the value of the bit No. 1 in the spread code corresponding to the bit No. 1 in the position information bit data is inverted. If the value of the bit No. 1 in the bit data that shows the position information is "0", the value of the bit No. 1 in the spread code is not inverted. This operation is performed in the unit of the bit data that shows the position information. For example, if n=100, the operation is performed in the unit of 100 bits, that is, every 100 bits. From the viewpoint of maintaining the conditions that each spread code needs to have, it is preferable that the number of bits of the spread code that is to be altered on the basis of the position information be about 1 or 2.

The despread code generation portion 208 alters the pre-set despread code on the basis of the input position information, as in the process performed by the spread code generation portion 102. For example, the value of at least one of the bits that constitute the pre-allotted despread code is altered on the basis of the value of at least one of the bits that express the position information.

The correlation computation portion 210 performs a correlation computation of the input base band signal and the input despread code, and inputs a result of the correlation computation to the selection portion 212. For example, the correlation computation portion 210 is constructed of a matched filter. For example, the correlation computation portion 210 performs a correlation computation of the received signal from the transmitter 100 present around the host vehicle's receiver 200 and the despread code generated on the basis of the position of the host vehicle's receiver 200. The signal transmitted from the transmitter 100 is spread by the spread code altered on the basis of the position information about the transmitter 100, and the despread code generated by the receiver 200 is a code altered on the basis of the position information about the receiver 200. Therefore, the closer the position of the transmitter 100 and the position of the receiver 200 are to each other, the higher the similarity between the two signals becomes, so that the correlation degree becomes correspondingly higher. Other constructions, features and the like of this embodiment are substantially the same as those of the foregoing second embodiment.

While this embodiment has been described in conjunction with the case where the spread code is altered on the basis of the position information, the invention is also applicable to the case where the spread code is altered on the basis of the velocity information.

Through the operation in this manner, the number of bits to be operated can be restrained to a level such that the characteristic requirement of the spread code will be maintained. That is, while the requirement that the spread code needs to meet is satisfied, the spread code and the despread code can be generated, on the basis of the position information.

The foregoing embodiment has been described in conjunction with the case where the signal transmitted from the transmitter 100 is received by the receiver 200 mounted in a vehicle other than the vehicle in which the transmitter 100 is mounted, that is, in conjunction with the case of vehicle-to-vehicle communication. The vehicle-to-vehicle communication may include the communication between a motor vehicle and a motor vehicle, the communication between a motor vehicle and a motor cycle, and the communication between a motor vehicle and a human being.

Besides, the invention may also be applied to a road-side communication system. For example, a road-side communication device is provided with a transmitter, and, for example, broadcasts information regarding an intersection to vehicles that cannot have vehicle-to-vehicle communication due to their being in areas at or around the intersection where the communication is blocked, or the like. Through the operation in this manner, a vehicle equipped with a receiver can detect the road-side communication instrument, so that the vehicle can obtain necessary information on the basis of the distance thereof from the road-side communication instrument.

While the foregoing description has been made with concrete examples of numerical values and the like being used to facilitate the understanding of the invention, such numerical values and the like are mere examples, and may be changed to any other appropriate values in actual applications, unless otherwise mentioned.

While the invention has been described with reference to specific embodiments, the embodiments are merely illustrative, and those with ordinary skill in the art will understand that the invention can be carried out with various modifications, changes, substitutions, replacements, etc. While the devices in accordance with the embodiments of the invention are described above by using functional block diagrams for convenience in description, such devices may be realized by hardware devices, or software devices, or combinations thereof. The invention is not limited to the foregoing embodiments, but includes various modifications, changes, substitutions, replacements, etc. without departing from the spirit of the invention.

The invention claimed is:

1. A transmitter that performs communication in a spread spectrum communication mode, comprising:
   a transmitter parameter setting portion that sets a parameter about the transmitter itself;
   a spread code generation portion that generates a spread code based on the parameter set by the transmitter parameter setting portion; and
   a transmitting portion that spreads transmit-data to form a spread signal using the spread code generated by the spread code generation portion, and that transmits the spread signal, wherein
   the transmitter sets a condition for selecting a receiver with which the transmitter itself communicates and sets the parameter corresponding to the condition, and
   the spread code contains a first spread code that shows a planar position of the transmitter itself and a second spread code that shows a vertical position of the transmitter itself.

2. The transmitter according to claim 1, wherein the transmitter parameter setting portion sets position information about the transmitter itself as the parameter of the transmitter itself.

3. A transmitter that performs communication in a spread spectrum communication mode, comprising:
   a synchronization portion that synchronizes the transmitter itself and a receiver with which the transmitter itself communicates;
   a spread code generation portion that generates the spread code based on the position information about the transmitter itself; and
   a transmitting portion that spreads transmit-data to form a spread signal using the spread code generated by the spread code generation portion, and that transmits the spread signal, wherein
   the spread code generation portion generates the spread code synchronously with the receiver based on the position information about the transmitter itself, and
   the spread code contains a first spread code that shows a planar position of the transmitter itself and a second spread code that shows a vertical position of the transmitter itself.

4. A receiver that performs communication in a spread spectrum communication mode, comprises:
   a receiving portion that receives a signal which is formed and transmitted by a transmitter, the signal being formed by
      setting a parameter about the transmitter itself based on a parameter that corresponds to a condition for selecting the receiver with which the transmitter communicates, generating a spread code based on the set parameter, and spreading transmit-data using the generated spread code;

a receiver parameter setting portion that sets a parameter about the receiver itself based on the parameter that corresponds to the condition;

a despread code generation portion that generates a despread code based on the parameter set by the receiver parameter setting portion;

a correlation computation portion that performs a correlation computation of the signal received by the receiving portion and the despread code generated by the despread code generation portion; and a selection portion that sets a transmitter with which the receiver itself communicates, based on a result of the correlation computation, wherein the transmitter sets position information about the transmitter itself as the parameter of the transmitter itself, and the receiver parameter setting portion sets position information about the receiver itself as the parameter about the receiver itself, and the correlation computation portion has a position specific determination portion which compares the spread code generated by the transmitter and the despread code generated by the despread code generation portion, which detects a bit string in which values do not match between the spread code and the despread code, which creates a replica spread code from the despread code by inverting the values of the bit string detected, and which detects the position information of the transmitter based on the created replica spread code.

5. The receiver according to claim 4, further comprising a position estimation portion that estimates a position of the transmitter after an elapse of a predetermined time based on the position information about the transmitter detected by the position specific determination portion, wherein the despread code generation portion generates the despread code based on the position information about the position estimated as the position of the transmitter occurring after the elapse of the predetermined time.

6. A receiver that performs communication in a spread spectrum communication mode, comprises:

a synchronization portion that synchronizes the receiver itself and a transmitter, which communicates with the receiver itself, which generates a spread code synchronously with the receiver based on position information about the transmitter itself, spreads transmit-data to form a spread signal using the generated spread code, and transmits the spread signal;

a receiving portion that receives the signal transmitted by the transmitter;

a despread code generation portion generates a despread code based on the position information about the receiver itself;

a correlation computation portion that performs a correlation computation of the signal received by the receiving portion and the despread code generated by the despread code generation portion; and a selection portion that selects the transmitter that the receiver itself communicates with based on a result of the correlation computation, wherein the despread code generation portion generates the despread code synchronously with the transmitter based on the position information about the receiver itself, and the correlation computation portion has a position specific determination portion which compares the spread code generated by the transmitter and the despread code generated by the despread code generation portion, which detects a bit string in which values do not match between the spread code and the despread code, which creates a replica spread code from the despread code by inverting the values of the bit string detected, and which detects the position information of the transmitter based on the created replica spread code.

7. A wireless communication system having a transmitter and a receiver that communicate in a spread spectrum communication mode, wherein the transmitter has:
a transmitter parameter setting portion that sets a parameter about the transmitter itself based on a parameter made to correspond to a condition for selecting the receiver with which the transmitter itself communicates;

a spread code generation portion that generates a spread code based on the parameter set by the transmitter parameter setting portion; and a transmitting portion which spreads transmit-data to form a spread signal using the spread code generated by the spread code generation portion, and which transmits the spread signal, the receiver has:
a receiving portion that receives the signal transmitted by the transmitter;

a receiver parameter setting portion that sets a parameter about the receiver itself based on a parameter made to correspond to the condition;

a despread code generation portion that generates a despread code based on the parameter set by the receiver parameter setting portion;

a correlation computation portion that performs a correlation computation of the signal received by the receiving portion and the despread code generated by the despread code generation portion; and a selection portion that selects the transmitter to communicate with based on a result of the correlation computation, the transmitter parameter setting portion sets position information about the transmitter itself as the parameter of the transmitter itself, and the receiver parameter setting portion sets position information about the receiver itself as the parameter about the receiver itself, and the correlation computation portion has a position specific determination portion which compares the spread code generated by the transmitter and the despread code generated by the despread code generation portion, which detects a bit string in which values do not match between the spread code and the despread code, which creates a replica spread code from the despread code by inverting the values of the bit string detected, and which detects the position information of the transmitter based on the created replica spread code.

8. The wireless communication system according to claim 7, wherein the selection portion selects the transmitter that has a correlation value higher than a predetermined threshold value.

9. The wireless communication system according to claim 7, wherein the selection portion selects the transmitter that has a rate of change that is higher than a predetermined threshold rate.

10. The wireless communication system according to claim 7, wherein the spread code generation portion generates a spread code that contains a first spread code that shows a planar position of the transmitter itself and a second spread code that shows a vertical position of the transmitter itself, the despread code generation portion generates a despread code that contains a first despread code that shows a planar position of the receiver itself and a second despread code that shows a vertical position of the receiver itself, and the correlation computation portion performs a correlation computation of the signal received by the receiving portion with the first despread code and the second despread code.

11. The wireless communication system according to claim 10, wherein the selection portion excludes beforehand a transmitter from an object of selection if a result of correlation of the transmitter based on the second spread code is less than or equal to a predetermined value.

12. A wireless communication system that has a transmitter and a receiver that communicate in a spread spectrum communication mode, wherein the transmitter has:
a synchronization portion that synchronizes the transmitter itself and the receiver with which the transmitter itself communicates;
a spread code generation portion that generates a spread code synchronously with the receiver based on position information about the transmitter itself; and
a transmitting portion which spreads transmit-data to form a spread signal using the spread code generated by the spread code generation portion, and which transmits the spread signal, the receiver has:
a synchronization portion that synchronizes the receiver itself and the transmitter with which the receiver itself communicates;
a receiving portion that receives the signal transmitted by the transmitter;
a despread code generation portion that generates a despread code synchronously with the transmitter based on position information about the receiver itself;
a correlation computation portion that performs a correlation computation of the signal received by the receiving portion and the despread code generated by the despread code generation portion; and
a selection portion that selects the transmitter to communicate with, based on a result of the correlation computation, and the correlation computation portion has a position specific determination portion which compares the spread code generated by the transmitter and the despread code generated by the despread code generation portion, which detects a bit string in which values do not match between the spread code and the despread code, which creates a replica spread code from the despread code by inverting the values of the bit string detected, and which detects the position information of the transmitter based on the created replica spread code.

13. The wireless communication system according to claim 12, wherein the spread code and the despread code have periodicity,
a phase of the spread code and the despread code and position are made to correspond to each other beforehand, the spread code generation portion generates the spread code based on the phase of the spread code made to correspond to the position information of the transmitter, and the despread code generation portion generates the despread code based on the phase of the despread code made to correspond to the position information of the receiver.

14. The wireless communication system according to claim 13, wherein the spread code and the despread code correspond to spatial position on a one-to-one basis.

15. The wireless communication system according to claim 13, wherein the spread code and the despread code made to correspond to the position are different from each other only in phase, and are the same in succession.

16. The wireless communication system according to claim 12, wherein the synchronization portion performs synchronization by time of a GPS.

17. The wireless communication system according to claim 16, wherein the synchronization portion performs the synchronization by causing fluctuation of the phase to be followed based on information obtained from the GPS.

18. The wireless communication system according to claim 12, wherein the selection portion selects the transmitter to communicate with based on a phase difference between the despread code generated by the receiver itself and the spread code generated by the transmitter.

19. The wireless communication system according to claim 12, wherein the transmitter has a transmitter resolution adjustment portion that adjusts resolution of the position information about the transmitter, and the receiver has a receiver resolution adjustment portion that adjusts resolution of the position information about the receiver.

20. The wireless communication system according to claim 12, wherein an origin point of the position information is an electric reference point.

21. A communication method in a wireless communication system that has a transmitter and a receiver that communicate in a spread spectrum communication mode, comprising:

a transmitter parameter setting step in which the transmitter sets a parameter about the transmitter itself based on a parameter made to correspond to a condition for selecting the receiver with which the transmitter itself communicates;

a spread code generation step in which the transmitter generates a spread code based on the parameter set in the transmitter parameter setting step;

a transmitting step in which the transmitter spreads transmit-data to form a spread signal using the spread code generated in the spread code generation step, and transmits the spread signal;

a receiving step in which the receiver receives the signal transmitted by the transmitter;

a receiver parameter setting step in which the receiver sets a parameter about the receiver itself based on the parameter made to correspond to the condition;

a despread code generation step in which the receiver generates a despread code based on the parameter set in the receiver parameter setting step;

a correlation computation step in which the receiver performs a correlation computation of the signal received in the receiving step and the despread code generated in the despread code generation step; and a selection step in which the receiver selects the transmitter to communicate with based on a result of the correlation computation, wherein the transmitter parameter setting step includes setting position information about the transmitter itself as the parameter of the transmitter itself, and the receiver parameter setting step includes setting position information about the receiver itself as the parameter about the receiver itself, and the correlation computation step includes comparing the spread code generated by the transmitter and the despread code generated by the despread code generation portion, detecting a bit string in which values do not match between the spread code and the despread code, creating a replica spread code from the despread code by inverting the values of the bit string detected, and detecting the position information of the transmitter based on the created replica spread code.

22. A communication method in a wireless communication system that has a transmitter and a receiver that communicate in a spread spectrum communication mode, comprising:

a synchronization step in which the transmitter and the receiver are synchronized;

a spread code generation step in which the transmitter generates a spread code synchronously with the receiver based on position information about the transmitter itself;

a transmitting step in which the transmitter spreads transmit-data to form a spread signal using the spread code generated in the spread code generation step, and transmits the spread signal;

a receiving step in which the receiver receives the signal transmitted by the transmitter;

a despread code generation step in which the receiver generates a despread code synchronously with the transmitter based on position information about the transmitter itself;

a correlation computation step in which a correlation computation of the signal received in the receiving step and the despread code generated in the despread code generation step is performed; and a selection step in which the receiver selects the transmitter to communicate with based on a result of the correlation computation, wherein the correlation computation step includes comparing the spread code generated by the transmitter and the despread code generated by the despread code generation portion, detecting a bit string in which values do not match between the spread code and the despread code, creating a replica spread code from the despread code by inverting the values of the bit string detected, and detecting the position information of the transmitter based on the created replica spread code.

* * * * *